(12) United States Patent
Kutsuwada

(10) Patent No.: US 6,347,203 B1
(45) Date of Patent: Feb. 12, 2002

(54) IMAGE FORMING APPARATUS AND JOB CONTROL APPARATUS FOR SHEET DISCHARGE PROCESSING UNIT

(75) Inventor: Satoru Kutsuwada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/480,177

(22) Filed: Jan. 10, 2000

(30) Foreign Application Priority Data

Jan. 14, 1999 (JP) .......................................... 11-008149

(51) Int. Cl.[7] .............................................. G03G 15/00
(52) U.S. Cl. .......................................... 399/82; 399/403
(58) Field of Search ........................... 399/82, 83, 403, 399/407, 405; 271/288, 292

(56) References Cited

U.S. PATENT DOCUMENTS

| | | | |
|---|---|---|---|
| 4,502,776 A | * 3/1985 | Matsumoto et al. | 399/403 |
| 4,557,589 A | * 12/1985 | Fukushi | 399/403 |
| 5,640,232 A | 6/1997 | Miyake et al. | 399/18 |
| 5,669,040 A | * 9/1997 | Hisatake | 399/83 |
| 5,729,791 A | * 3/1998 | Kutsuwada et al. | 399/82 |
| 5,734,480 A | * 3/1998 | Kawamura et al. | 358/296 |
| 5,822,075 A | 10/1998 | Kaneko et al. | 358/296 |
| 5,913,093 A | * 6/1999 | Yamanaka et al. | 399/82 |
| 5,946,541 A | * 8/1999 | Kakigi | 399/405 |
| 5,995,779 A | * 11/1999 | Natsume et al. | 399/82 |

* cited by examiner

*Primary Examiner*—Robert Beatty
(74) *Attorney, Agent, or Firm*—Fitzpatrick, Cella, Harper & Scinto

(57) ABSTRACT

In order to raise the productivity of jobs to be output by an image forming apparatus, sheets belonging to a plurality of jobs that have been input are ejected in parallel in dependence upon the type of a sheet stacking apparatus connected to the image forming apparatus. Further, sheets belonging to a plurality of jobs that have been input are ejected in turns in dependence upon the status of use of a sheet stacking apparatus connected to the image forming apparatus. The sheet stacking apparatus is controlled in such a manner that sheets belonging to a plurality of jobs that have been input to the image forming apparatus can be ejected in parallel.

58 Claims, 11 Drawing Sheets

⇓ USER MODE KEY 516 PRESSED

⇓ IF KEY 5020 IS PRESSED

⇓ IF KEY 5021 IS PRESSED

IMAGE FORMING APPARATUS AND JOB CONTROL APPARATUS FOR SHEET DISCHARGE PROCESSING UNIT

BACKGROUND OF THE INVENTION

1. Field of the Invention

This invention relates to an image forming apparatus for forming an image, which is based upon input data, on a sheet, and to a control apparatus for controlling an image forming system.

2. Description of the Related Art

Copiers, facsimile machines and printers used to be employed as stand-alone devices. Nowadays, however, with the spread of networks, arrangements in which a printer can be shared by a plurality of users have been constructed and there is growing demand for the sharing of copiers and facsimile machines as well.

Copiers, facsimile machines and printers all contain a printing mechanism, and there would be advantages to be gained in terms of cost and space if a digital multifunction apparatus integrating these functions could be constructed. Such apparatus and systems have in fact been realized as actual products.

A problem which arises is how to arbitrate requests for copy jobs, print jobs based upon print data from a host computer and facsimile reception jobs using such an apparatus. One conceivable method is to set printing priority beforehand using a control panel or the like and then execute processing in accordance with the order of priority set.

However, control solely of printing priority set by a control panel or the like completely ignores the absence or presence of a sheet processing apparatus, such as sorter and finisher etc. connected to the image forming apparatus as well as the functions of the sheet processing apparatus. Thus there is the possibility that jobs will not be managed efficiently.

SUMMARY OF THE INVENTION

Accordingly, an object of the present invention is to provide an image forming apparatus and a control apparatus that solves the aforementioned problem.

Another object of the present invention is to provide an image forming apparatus and a control apparatus for carrying out optimum job scheduling and raising the productivity of a job to be output.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 1:
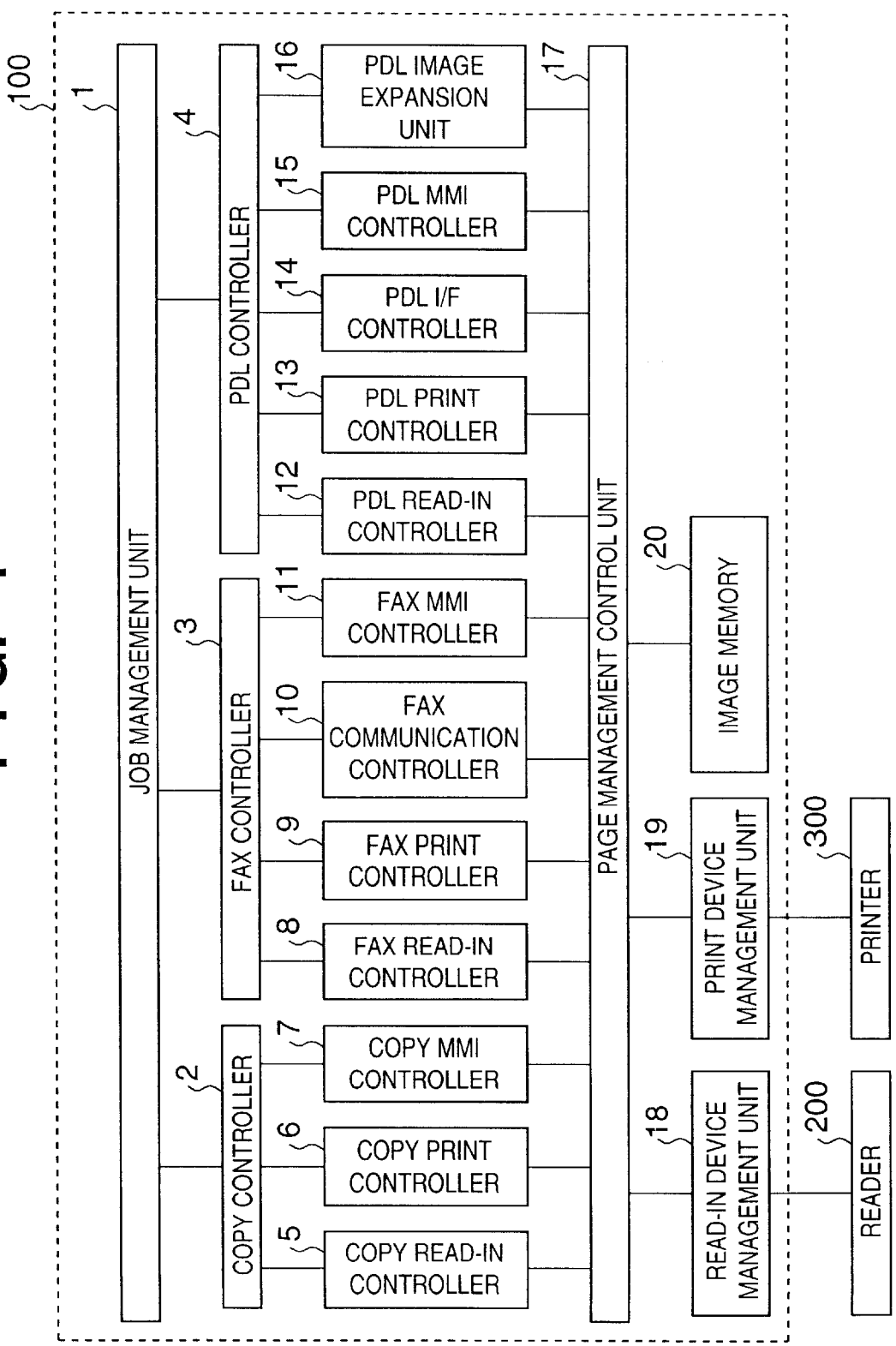
FIG. 1 is a block diagram showing an apparatus according to an embodiment of the present invention.

FIG. 1 is a functional block diagram showing an image forming apparatus according to an embodiment of the present invention.

The apparatus includes an image input/output unit (reader) 200 for converting a document to image data, an image output unit (printer) 300 which, in order to execute image formation processing, accommodates printing paper cassettes of a plurality of types and, in response to a print command, outputs image data on printing paper as a visible image, and a controller 100, which has a variety of functions, electrically connected to the reader 200 and printer 300. In a case where a sheet processing unit such as a finisher or sorter has been connected to the main body of the image forming apparatus, the controller 100 exercises overall control of the sheet processing unit and of the other components as well.

In order for the apparatus of this embodiment to function as an image reader, printer and facsimile machine, the apparatus is provided with a FAX communication controller 10, a PDL computer interface controller 14 for effecting a connection to a computer and LAN, a PDL image expansion unit 16 for visualizing information from a computer, and an image memory 20 for accumulating information from the reader 200 and temporarily accumulating information that has been sent from the computer. The image memory 20 stores and accumulates images from the reader, FAX communication interface and computer interface and rotates images. The image memory 20 can be expanded and whether image memory has been added on can be discriminated by a connect signal (not shown), which is for detecting the mounting of additional memory.

The controller 100 includes a job management unit 1 for managing and controlling a job overall. The job management unit 1 controls a copy controller 2, which controls a copying function, a FAX controller 3, which controls a facsimile function, and a PDL printer controller 4, which expands code information from a computer into image information and controls printing. As mentioned above, the image memory 20 accumulates information from the reader 200 and temporarily accumulates information sent from the computer.

The copy controller 2, namely a control system for functioning as a copier, is composed of a copy read-in controller 5 which controls document-read-in, a copy print controller 6 which prints an image read in by the copy read-in controller 5, and a copy MMI controller 7 which performs copy screen control.

The FAX controller 3 is composed of a FAX read-in controller 8 for controlling document read-in, a FAX print controller 9 for printing a facsimile report, a received image and an image that has been read in by the FAX read-in controller 8, a FAX communication controller 10 for controlling the sending and receiving of facsimile, and an FAX MMI controller 11 for performing facsimile screen control.

The PDL controller 4 is composed of a PDL interface controller 14 for controlling a network interface or ordinary printer interface to thereby receive print data (PDL data) described in page description language (PDL), a PDL read-in controller 12 which reads in received print data, a PDL print controller 13 for controlling printing based upon print data described in PDL, a PDL MMI controller 15, and a PDL image expansion unit 16 for expanding image data from PDL data. In a case where the apparatus functions as an image scanner, the PDL interface controller 14 is used to transmit read image data to the host computer that requests it or to output the read image data.

Figure 2:
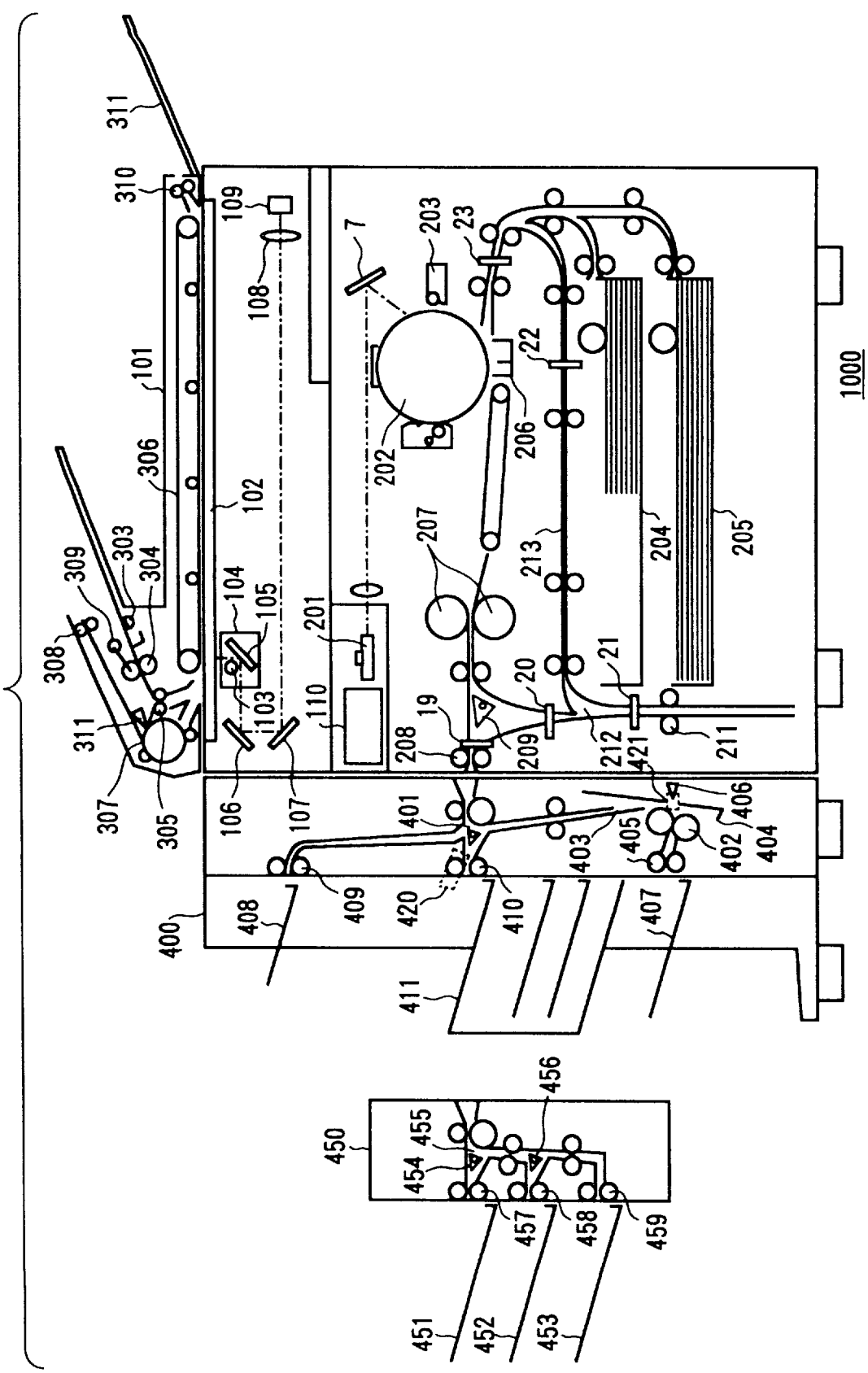
FIG. 2 is a sectional view showing the structure of the apparatus according to this embodiment.

The image forming apparatus proper according to this embodiment is so adapted as to be connectable to a sheet processing unit such as a finisher or sorter (see FIG. 2). A CPU (not shown) within the controller 100 of the image forming apparatus and a CPU (not shown) of a controller within the sheet processing unit are capable of exchanging information via a prescribed communication medium. As a result, the controller 100 is capable of acquiring information as to whether the sheet processing unit has been connected to the image forming apparatus proper, information as to the type of sheet processing unit (e.g., movable-tray type or stationary-tray type, etc.) connected, and information as to whether there are sheets in each tray of the sheet processing unit and the particular tray that is currently being accessed (i.e., information as to which tray is currently in use for the purpose of ejecting a sheet). These items of information can be managed by the controller 100. These items of information are utilized when the processing indicated by the flowchart of FIG. 3 or FIG. 11, described later, is executed.

FIGS. 5A to 5D are diagrams showing the details of a control panel on the image forming apparatus of this embodiment as well as the content of a display presented on a screen in the user mode. As shown in FIG. 5(*a*), the control panel includes various keys (indicated at 502 to 504) and a display unit 501 composed of a dot matrix comprising a liquid-crystal display device or the like. The liquid-crystal display unit 501 is provided with a touch-sensitive sensor and inputs can be made from various keys displayed on the liquid-crystal display unit 501. Displayed on the liquid-crystal display unit 501 are virtual buttons and various control screens for deciding the status of the apparatus, number of copies, magnification and selected paper.

A start key 503 is for starting a copying operation, and a restore key 505 is for restoring the set mode to a standard mode. A key group 102 is provided with numeric keys 502 of 0 to 9 for entering number of copies and zoom magnification, etc., and a clear key for clearing this input. A density key 505 is for raising or lowering density. Density thus adjusted is displayed in a display area 507. A key 506 is a key and its display for turning an automatic density adjustment function on and off. A key 508 is for selecting a paper-feed tier and an automatic paper selection function. Keys 509, 510, 511 and 512 are keys for non-magnification, zoom, reduction and enlargement, respectively. A key 514 is for setting various image processing modes and a key 513 for setting a double-sided function. A key 516 is a user-mode key for setting a function desired by the user.

Figure 5A:
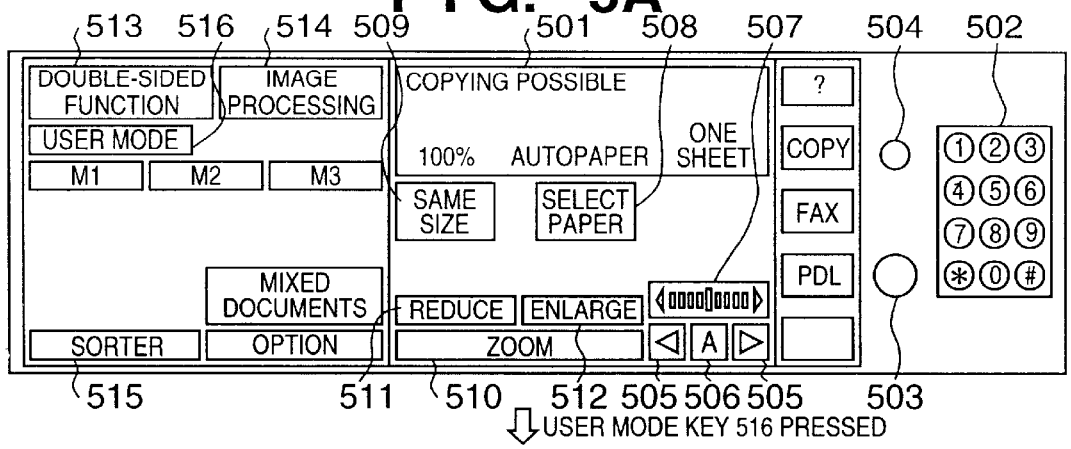
FIGS. 5A to 5D are diagrams showing a control panel and the transition thereof caused by operating the panel of this embodiment.
Figure 5B:
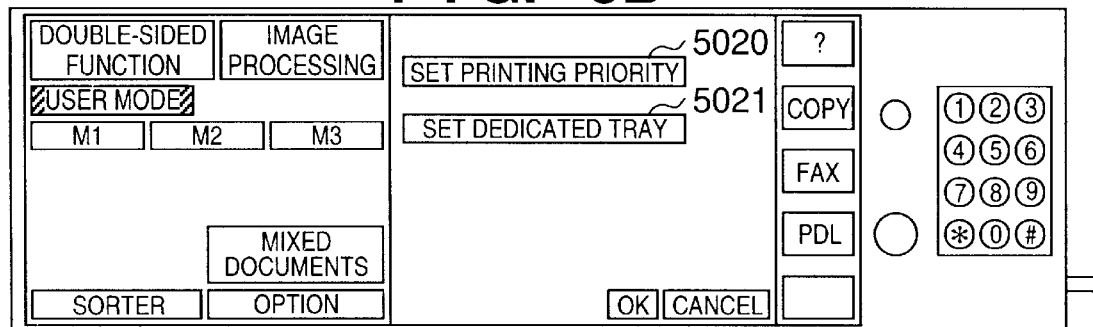
Figure 5C:
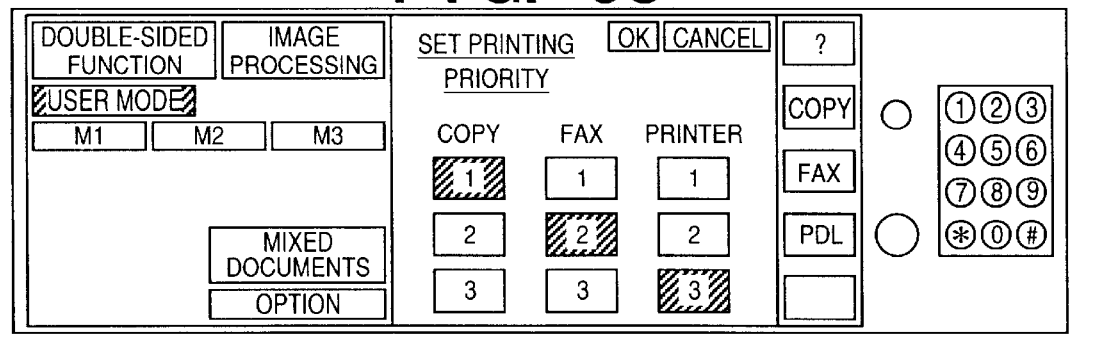
Figure 5D:
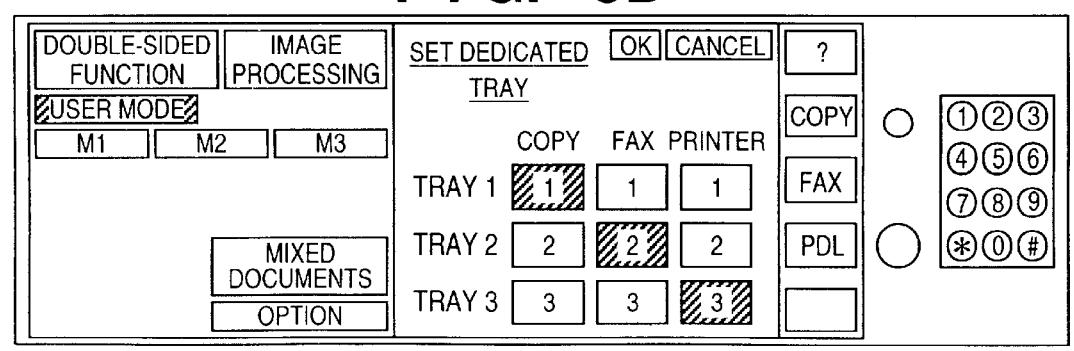

FIGS. 5B to 5D illustrate setting screens displayed on the control panel in a case were the user-mode key 516 has been pressed by the user.

FIG. 5B shows a screen indicating a list of user modes displayed on the control panel in a case where the user-mode key 516 has been pressed by the user on the screen shown in FIG. 5A. The screen is a selection screen for choosing either a mode in which printing priority is set or a mode in which a dedicated tray is set. FIG. 5C shows a setting screen displayed in a case where "SET PRINTING PRIORITY" has been chosen on the screen depicted in FIG. 5B. FIG. 5D shows a designating screen displayed in a case where "SET DEDICATED TRAY" has been selected on the screen of FIG. 5B. "SET DEDICATED TRAY" is for designating, job by job, the tray into which a copy is to be dropped at the time of printing (i.e., for assigning the tray used for each job). Here it is possible to select a plurality of trays. These items of selected information are stored in a data storage RAM (not shown) within the controller 100.

According to this embodiment, the user is capable of setting the order of priority of jobs relating to a copy function, facsimile function and PDL printer function. (As long as a change is not made, the set order of priority is retained in a RAM, not shown.)

The drawings illustrate an example in which priority is set in the following order: a job in the copy mode (referred to as a "copy job" below), a job in the facsimile mode (referred to as a "facsimile job" below) and job in the print mode (referred to as a "PDL job" below). For example, in accordance with this setting, assume that an image forming apparatus 1000 is executing a PDL print job. If the job management unit 1 receives a request to start a copy job, the apparatus suspends the PDL print job currently being executed and executes the copy job preferentially. When the copy job is finished, the apparatus resumes the PDL print job. Thus, the user is capable of setting the order of priority of jobs relating to the various functions.

It should be noted that the screen shown in FIG. 5C is displayed in a case where a key 5020 has been pressed by the user on the screen shown in FIG. 5B.

In a case where a sheet processing unit, e.g., a finishing unit 400 or 450, has been connected to the image forming apparatus 1000 and the sheet processing unit has a plurality of trays, the user is capable of designating, job by job, the ejected-sheet destination on the dedicated-tray designating screen shown in FIG. 5D.

FIG. 5D illustrates a case where the image forming apparatus 1000 has three trays, namely Tray 1, Tray 2 and Tray 3. The illustrated setting is such that printing paper processed in a copy job is ejected into Tray 1, printing paper processed in a FAX job is ejected into Tray 2, and printing paper processing in a PDL print job is ejected into Tray 3. It should be noted that the screen of FIG. 5D is displayed in a case where the user has pressed a key 5021 on the screen shown in FIG. 5B. Further, the content that has been set is retained in a RAM (not shown) within the controller 100.

According to this embodiment, the controller 100 performs sheet ejection control in such a manner that the sheets of a plurality of jobs will not become mixed in one tray regardless of whether or not a tray designation has been made by the user.

Further, according to this embodiment, whether or not a sheet processing unit has been connected (e.g., information relating to whether or not the finishing unit 400 or 450 has been connected) and the type of sheet processing unit (e.g., information such as whether the trays possessed by the sheet processing unit are of movable or stationary type) are detected, and the order in which jobs (copy, FAX and PDL print jobs) are processed is set (i.e., the scheduling of the jobs is performed) based upon the detected information relating to the sheet processing unit and the priority of the jobs designated by the user at the control panel. Control is then carried out by the job management unit 1 in such a manner that the jobs are processed one after another.

FIG. 2 shows the cross-sectional structure of the image forming apparatus according to this embodiment. The controller 100 in the arrangement shown in FIG. 1 is contained on an electronic circuit board 110 in FIG. 2. FIG. 2 illustrates mainly the construction of the reader 200 and printer 300. The construction and operation of the apparatus shown in FIG. 2 will now be described.

<Operation of document feeder>

Documents stacked face-up on a document stacker of a document feeder 101 are transported to and placed on a glass platen 102 sequentially one sheet at a time. A stacking tray is provided along the document transport direction with width-direction regulating plates in such a manner that the documents will not meander when they are fed. The plates slide in a direction perpendicular to the document feed direction.

An operation for separating documents from the bottom of the stack thereof will be described first.

The documents are separated one sheet at a time from the bottom of the document stack by a semi-circular roller 303 and separation roller 304, and the separated documents are transported up to an exposure position at the glass platen 102 by transport rollers 305 and a full-surface belt 306. After a document stops at this position, reading of the image on the document starts. When the image reading operation ends, the document on the glass platen 102 is returned to the top of the stack by a large transport roller 307 and transport rollers 308.

An operation for separating documents from the top of the stack thereof will be described next.

The documents are separated one sheet at a time from the top of the document stack by a pick-up roller 309 and the separation roller 304, and the separated documents are transported up to the exposure position at the glass platen 102 by the transport rollers 305 and full-surface belt 306. After a document stops at this position, reading of the image on the document starts. When the image reading operation ends, the document on the glass platen 102 is ejected into an external output tray by external paper ejection rollers 310.

In the case of double-sided documents, once the document is introduced to the image reading position and has its image read in the manner described above, a swingable switching flapper 311 is switched to introduce the leading edge of this document to the transport rollers 305 and full-surface belt 306, which transport the document to the glass platen 102, where the document stops. In other words, rotation of the large transport roller 307 turns the document over.

<Document read-in and printing operations>

If, when the apparatus is started at a control panel provided on the front side thereof, a document has been placed on the document feeder 101, the apparatus waits for the document to be fed and transported to the predetermined position of the glass platen 102 in the manner described above. If a document has been placed directly at the predetermined position of the glass platen 102, a scanner lamp 103 lights and a scanner unit 104 moves in response to the start command from the control panel, whereby the document is illuminated. Light reflected from the document enters a CCD image sensor 109 (referred to as a "CCD" below) via mirrors 105, 106, 107 and a lens 108.

Under the control of the copy controller 2 within controller 100 (already described as being on the electronic circuit board 110), image processing that has been set at the control panel is executed. Next, an image signal is selected by a selector circuit (not shown) and the image signal is connected to the image memory 20 in the controller 100, to the printer 300 and to the controller 100. The electric signal connected to the printer 300 is converted to an optical signal, which has been modulated by an exposure controller 201, and the light signal irradiates a photosensitive drum 202. A latent image formed on the photosensitive drum 202 by the irradiating light is developed by a developing device 203. At a timing in conformity with the leading edge of the latent image, transfer paper is transported by a transfer-paper stacker 204 or transfer-paper stacker 205 and the developed image is transferred to the paper at a transfer unit 206. After the transferred image is fixed on the transfer paper at fixing unit 207, the paper is ejected to the exterior of the apparatus from a paper ejection unit 208. Further, the electric signal connected to the image memory 20 is stored in a compressed-image storage unit within the image memory 20 by an image compression controller (not shown). Once the image has been stored in the image memory 20, the image is sent to the selector circuit again by an image-expansion controller (not shown) and is connected to the printer 300.

<Operation of finishing unit 400>

A sheet on which an image has been copied (recording medium or paper on which recording has been completed) output from the paper ejection unit 208 enters the finishing unit 400. The finishing unit 400 has 3-bin movable trays 411 capable of being moved up and down, a tray 408 used temporarily in a case where the trays 411 cannot be used, and a paper-ejection tray 407 for when pamphlets are folded. In a case where an output is made to the 3-bit movable trays 411, sheets on which images have been copied are ejected successively from the paper ejection rollers 208, enter transport rollers 401 of the finishing unit 400 and drop onto a prescribed tray of the trays 411 from ejection rollers 410. If a stapling mode is selected and a staple signal enters from the printer, a stapling device 420 is capable of stapling a stack of ejected sheets. The stapling device 420 is capable of being moved forward and backward so that any position on the sheets of transfer paper can be stapled. If paper to undergo different processing is output during the course of an output to the 3-bin trays 411, the paper passes transport rollers 401, takes the upper path and is ejected from ejection rollers 409 into the tray 408 for temporary use. In case of a pamphlet folding output, the paper traverses a transport path 403 and is stacked in a stacker 404 for pamphlet folding. The amount of projection of the stacker is adjusted depending upon the paper size. If a pamphlet folding signal is input from the printer in a case where the required number of copies of printing paper have been stacked, a stapling device 421 is driven to staple the central portion of the stacked sheets of printing paper, a folding controller 406 urges the paper in the direction of folding rollers 402, the paper is folded by the folding rollers 402 and the paper is ejected via paper-ejection rollers 405.

<Operation of finishing unit 450>

If the finishing unit 450 has been connected to the main body of the apparatus, transport paper output from the paper ejection unit 208 enters the finishing unit 450. The finishing unit 450 has fixed trays 451, 452 and 453 defining three bins.

If an output is to be made to tray 451, sheets on which images have been copied are ejected successively from the paper ejection rollers 208, enter the transport portion of the finishing unit 450 and are output into the tray 451 through paper-ejection rollers 457 by switching a flapper 454 in the direction of the tray 451. If sheets are to be ejected into the tray 452, the flapper 454 is switched in the direction of trays 452, 453 and a flapper 456 is switched in the direction of the tray 452, whereby the sheets are output into the tray 452 through paper-ejection rollers 458. If sheets are to be ejected into the tray 453, the flappers 454, 456 are switched in the direction of tray 453 and the sheets are output into the tray 453 through paper-ejection rollers 459.

Thus, in a sheet processing unit of the type in which the trays are stationary, sheets can be ejected into the desired trays merely by switching the flappers within the unit. Little preparation time is needed to change the tray to be used and the changeover to a desired tray can be performed by the time one page of image formation processing is completed by the printer 300 of the image forming apparatus. Whenever one sheet is output, therefore, there is no decline in the productivity of the output job even when the tray used is changed.

<Double-sided printing operation>

Output paper that has undergone fixation in the fixing unit 207 is caused to traverse a reversal path 212 by a flapper 209, then, in accordance with the timing signal from a sensor 21, rollers 211 are caused to reverse the direction of paper transport, whereby the transport direction is switched so that the paper is transported to a stacking portion 213 for resupplying paper that is to undergo transfer processing. When the next document is prepared, the document image is read through a process similar to that described above. However, since the transfer paper is supplied from the stacking portion 210 for resupplying paper. As a result, two document images are printed on the same output sheet of paper, i.e., one image is printed on the front side and one image on the back side of the sheet of paper.

<Back-side paper ejection operation>

Once output paper that has undergone fixation at the fixing unit 207 has its transport direction reversed by the flapper 209, is conveyed to the reversal rollers 211 and leaves the flapper 209, the reversal rollers 211 are rotated in the opposite direction to transport the paper to the paper ejection unit 208. Documents placed face-up and fed from the document feeder by being separated from the top of the stack are ejected by the above-described reversing paper ejection after image formation in such a manner that the order of the documents is maintained.

<Processing of job management unit>

Processing executed by the job management unit 1 will be described in accordance with the flowchart of FIG. 3. It should be noted that this processing is executed by having the CPU within the controller 100 read out and run a program, which has been stored in a ROM (not shown) of the controller 100, that is for execution of this processing.

The apparatus waits for a job (copy, FAX, PDL print, etc.) start request to arrive at step S301. A start request is received from the copy controller 2 in case of a copy job, from the FAX controller 3 in case of a facsimile job and from the PDL controller 4 in case of a PDL print job. Control proceeds to the processing of step S302 if a start request is received and to the processing of step S313 if a start request is not received.

A job for which there has been a start request is registered in a job queue (in a RAM, not shown) by the processing of step S302. The job queue will be described on the basis of FIG. 4.

Figure 4:
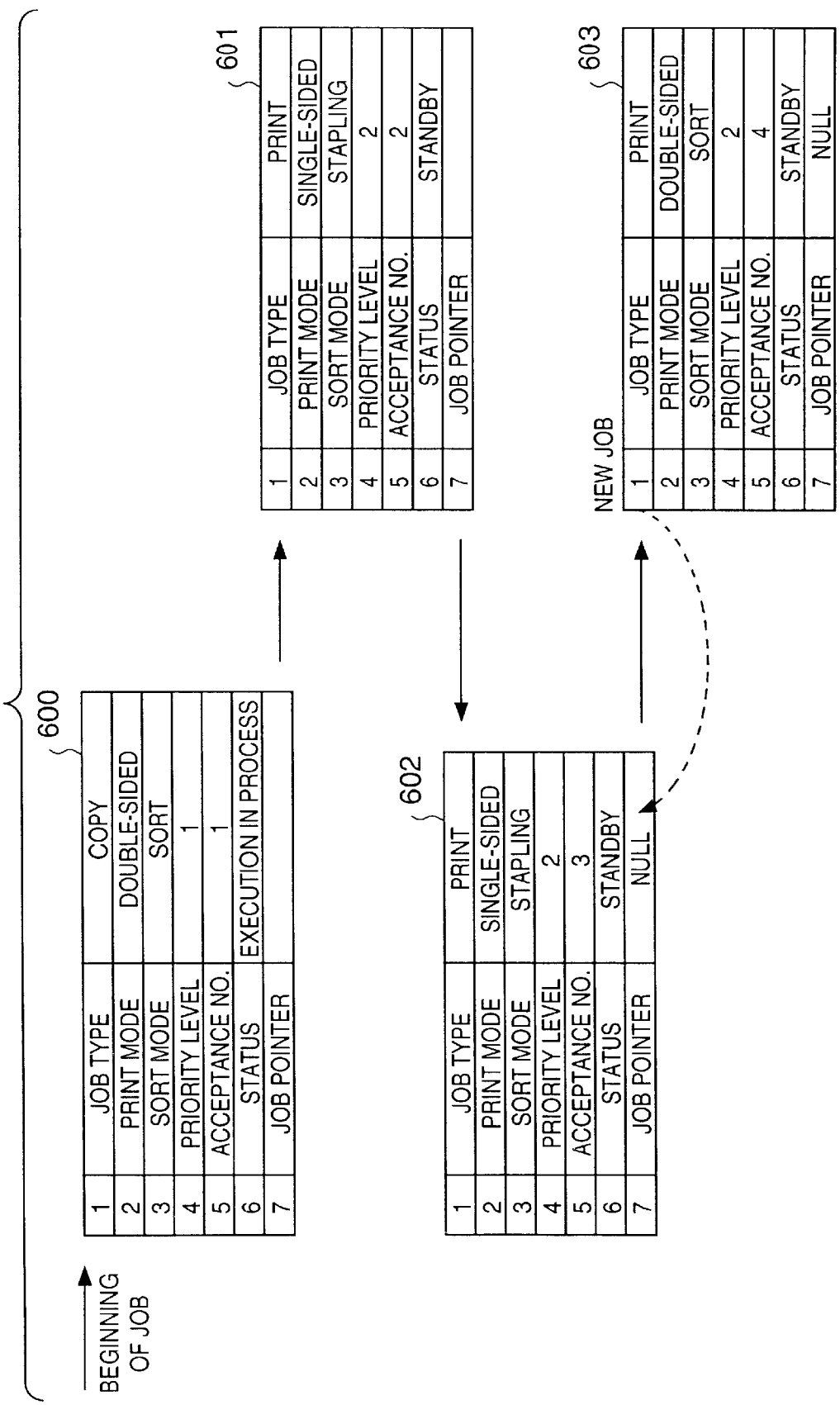
FIG. 4 is a diagram useful in describing the constitution of a job queue in this embodiment.

FIG. 4 assumes a case where one job (job 600) is currently being executed and two jobs (jobs 201 and 602) are standing by. In a case where a new job 603 is generated (a job pointer, described later, is made NULL), jobs are searched sequentially from the job heads by a job pointer (the seventh item of information), which indicates how the job queue is connected), and a job for which the job pointer is the NULL pointer is found (job 602 in this example). The pointer information indicating the data of the new job is set in the job pointer of job 602 and the job is registered. When a job is finished being executed, the pointer of this job is deleted and the remaining jobs are reconnected.

Figure 3:
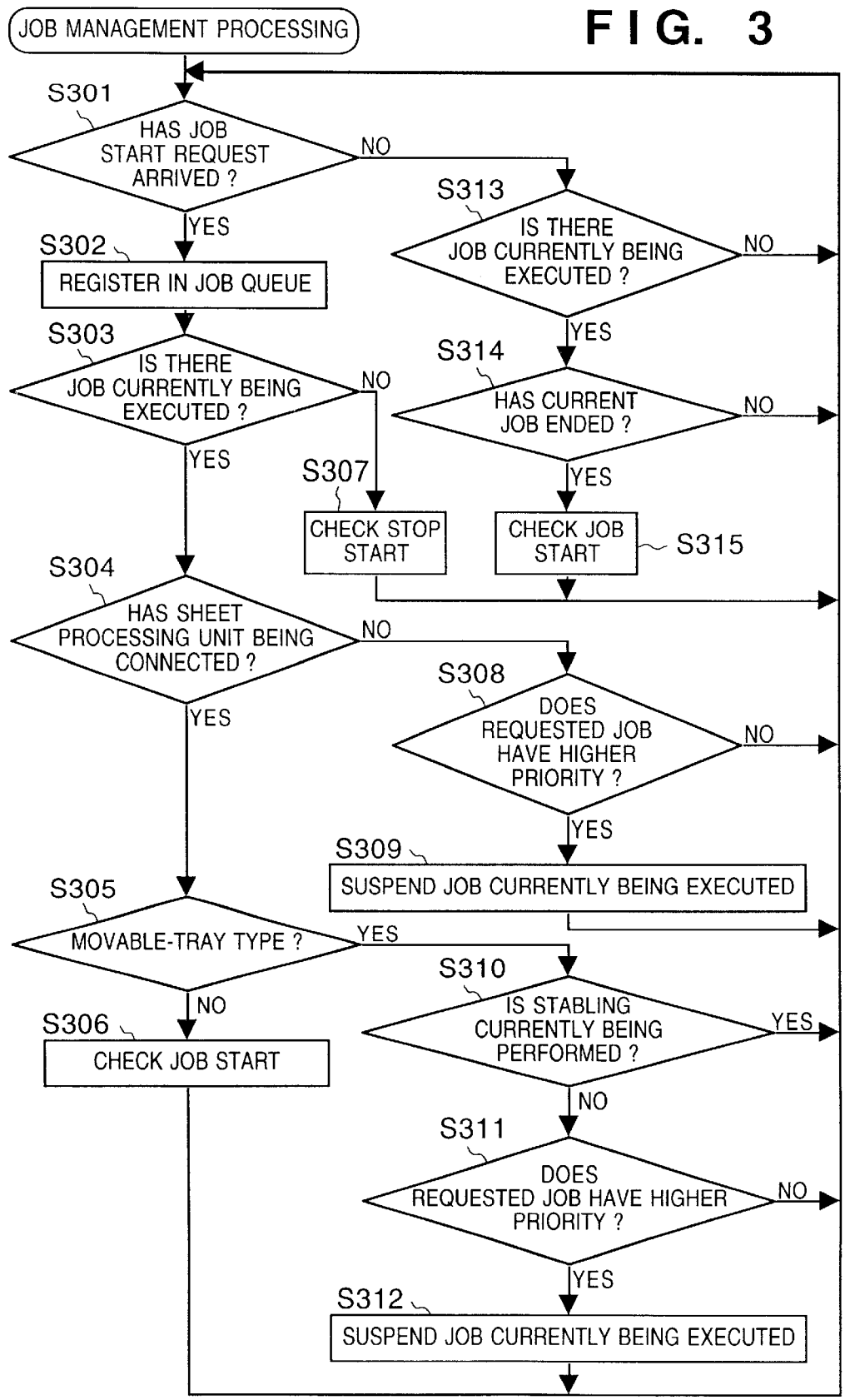
FIG. 3 is a flowchart illustrating the content of job scheduling processing according to this embodiment.

Next, at step S303 in FIG. 3, it is determined whether there is a job currently being executed. If there is no such job, job start processing is executed at step S307. Registered jobs are searched for starting from the head of the job queue shown in FIG. 4 and a job is started in accordance with the conditions of the job. The job management unit 1 notifies the various controllers of start of the job.

If it is found at step S303 that a job is currently being executed, then control proceeds to the processing of step S304. Here it is determined whether the sheet processing unit has been connected to the main body of the image forming apparatus. If the sheet processing unit has not been connected, control proceeds to the processing of step S308. Here, on the basis of information concerning the printing priority designated at the control panel [on the screen of FIG. 5C], the priority of the job for which start has been requested and the priority of the job currently being executed are judged. If the former has a lower priority than the latter (or if the priority has not been set), control returns to step S301 to wait for execution of the current job to end. If the former has a higher priority than the latter, then the job currently being executed is suspended at step S309 and control returns to step S301 so that the job can be executed after suspension.

If the sheet processing unit has been connected to the main body of the image forming apparatus, then the type of sheet processing unit, i.e., whether the trays are of the movable or stationary type, is determined at step S305. In case of the stationary type (e.g., sheet processing unit 450), control proceeds to the processing of step S306. In a case where the sheet processing unit has trays of the stationary type, image formation can be carried out without detracting from the performance of image formation. Even if there is already a job being executed, therefore, the job is performed simultaneously and scheduling processing on a per-page basis becomes possible. At step S306, therefore, processing similar to that of step S307 is executed and the job is started. As a result, sheets of the job which were being output previously and sheets of the succeeding job are ejected into the desired trays alternately one sheet at a time. At this time the job management unit 1 reconfigures scheduling in such a manner that a plurality of jobs will be executed in parallel.

In case of the movable-type trays (e.g., sheet processing unit 400), on the other hand, it is required that the trays be changed page by page (i.e., that the trays 411 be moved up and down) in order that the jobs may be executed simultaneously. In this case, the performance of image formation will decline if tray movement time exceeds the minimum time interval of image formation (i.e., if the time required for the printer 300 to execute one page of image formation processing is exceeded). Accordingly, taking into consideration the case described above, control proceeds to step S310 so that either of the jobs will be executed without executing both jobs simultaneously.

Control from step S310 onward will now be described.

It is determined at step S310 whether the stapling processing mode is currently in effect. If a job in the stapling mode is currently being executed, then the requested job is suspended and cannot be executed. Accordingly, the apparatus waits for completion of the job currently being executed. Control, therefore, returns to step S301.

If the job is not one in the stapling mode, then control proceeds to step S311. Here, on the basis of information concerning the printing order of priority designated at the control panel [on the screen of FIG. 5C], the priority of the job for which start has been requested and the priority of the job currently being executed are judged. If the former has a lower priority than the latter, scheduling is performed so to wait for completion of the job currently being executed, and control returns to step S301. If the former has a higher priority than the latter, then the job currently being executed is suspended at step S312. Scheduling is then performed so as to execute the succeeding job and, when this job is finished, to resume the suspended job, and control returns to step S301.

Figure 6:
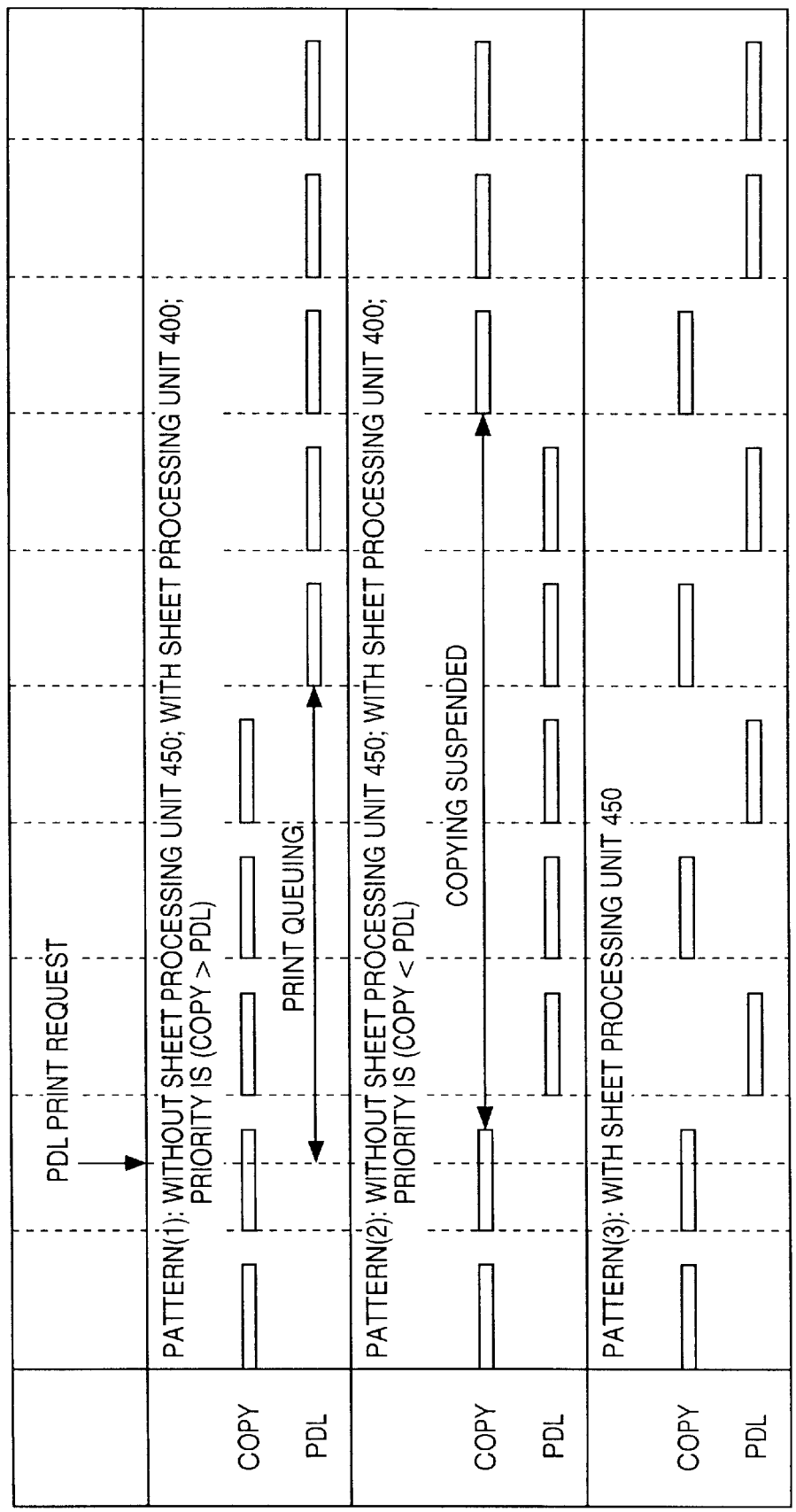
FIG. 6 is a diagram showing job scheduling results according to this embodiment.

FIG. 6 illustrates an example in a case where job scheduling is performed by the job management unit 1. The example of FIG. 6 is for a case where a request to start output of a PDL print job has been entered during execution of a copy job. It is assumed here that the copy and PDL print jobs both involve output of five pages and that the request to start output of the PDL print job has been entered during output of the second page of the copy job.

In FIG. 6, pattern (1) is for describing scheduling performed by the job management unit 1 in a case where the sheet processing unit 450 (stationary-tray type) has not been connected to the apparatus proper, the sheet processing unit 400 (movable-tray type) has been connected to the apparatus proper, and the order of priority set on the screen of FIG. 5C is copy>PDL. In this case, the PDL print job for which the output-start request was issued after that of the copy job has a priority lower than that of the copy job. As a consequence, the apparatus enters a state in which it waits for the end of the copy job currently being executed. Scheduling is performed in such a manner that output of the PDL print job starts when the copy job ends.

Pattern (2) in FIG. 6 is for describing scheduling performed by the job management unit 1 in a case where the sheet processing unit 450 (stationary-tray type) has not been connected to the apparatus proper, the sheet processing unit 400 (movable-tray type) has been connected to the apparatus proper, and the order of priority set on the screen of FIG. 5C is copy<PDL. In this case, the copy job currently being executed is suspended (FIG. 6 indicates suspension of the copy job at the moment the sheet on which the image of the second page of the copy job has been formed is output) and the PDL print job, which has a priority higher than that of the copy job, is started. The copy job is in the suspended state until the PDL print job ends, and output processing of the copy job is resumed upon waiting for the end of the PDL print job (FIG. 6 indicates that output is resumed from the third page of the copy job). This is how scheduling is performed in the case of pattern (2).

Pattern (3) in FIG. 6 is for describing scheduling performed by the job management unit 1 in a case where the sheet processing unit 450 (stationary-tray type) has been connected to the apparatus proper. In this case, scheduling is performed in such a manner that a plurality of entered jobs will be executed in parallel regardless of whether an order of priority has or has not been set on the screen shown in FIG. 5C.

For example, in the case of pattern (3), a PDL print job for which the output-start request was issued after that of the copy job is scheduled on a per-page basis and is output together with the copy job. In the illustrated example, the request to start output of the PDL print job is entered while output of the second page of the copy job is in progress. Accordingly, after a sheet on which the image of the second page of the copy job has been formed is ejected into a tray for the copy job, a sheet on which the image of the first page of the PDL print job has been formed is ejected into a tray for the PDL print job. At the next timing, a sheet on which the image of the third page of the copy job has been formed is ejected into the tray for the copy job. At the next timing, a sheet on which the image of the second page of the PDL print job has been formed is ejected into the tray for the PDL print job. At the next timing, a sheet on which the image of the fourth page of the copy job has been formed is ejected into the tray for the copy job. At the next timing, a sheet on which the image of the third page of the PDL print job has been formed is ejected into the tray for the PDL print job. At the next timing, a sheet on which the image of the fifth page of the copy job has been formed is ejected into the tray for the copy job (the copy job is concluded at this point). At the next timing, a sheet on which the image of the fourth page of the PDL print job has been formed is ejected into the tray for the PDL print job, and at the next timing, a sheet on which the image of the fifth page of the PDL print job has been formed is ejected into the tray for the PDL print job. This is how scheduling is performed in the case of pattern (3).

An arrangement may be adopted in which if, during execution of a certain job A, another job B is generated and the job B is then queued, a message or mark to this effect is displayed on the control panel. Conversely, if job B has the higher priority and job A is placed in the suspended state, a warning may be issued in the same manner. Further, this embodiment has been described in regard to a case where there are a plurality of jobs having different data input routes, i.e., a job in the copy mode and a job in the print mode, or a job in the copy mode and a job in the facsimile mode, or a job in the facsimile mode and a job in the print mode. However, this does not impose any limitation; it goes without saying that the processing of this embodiment can be realized even in a case where a plurality of jobs are input in the same mode. For example, even if during execution of a first job in the copy mode a request to start output of a second job in the copy mode is input in the form of interrupt processing, effects similar to those of the above-described embodiment can be obtained by executing processing of the kind shown in FIG. 3.

Further, it is permissible to adopt an arrangement in which when a manager needs to perform copying involving urgent business or needs to perform printing on short notice using his or her own personal computer, this job is given the highest priority temporarily. When copying is performed, information (e.g., an ID or password) indicating that the individual is the manger would be input. When printing on short notice is performed, the information input would be similar to that entered when the manager prints using his or her own terminal.

Further, an arrangement may be adopted in which when a prescribed operation is performed, the job that has been suspended and the queued state thereof are displayed on the control panel to notify the operator of the number of his or her own job at that time. If the operator is the manager, then the manager may change the priority of one of the jobs to the highest priority.

<Processing in copy mode>

Figure 7:
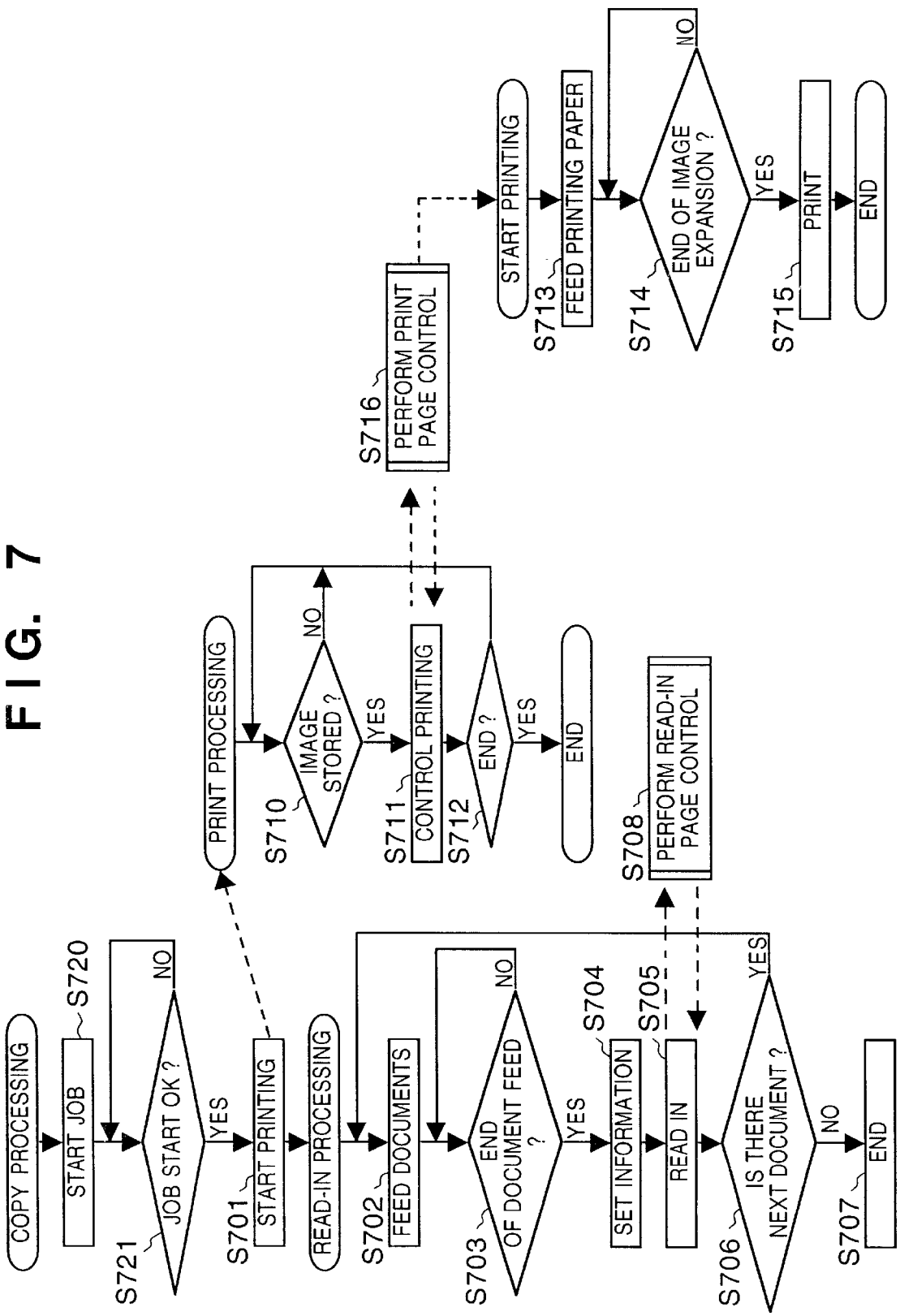
FIG. 7 is a flowchart illustrating the content of copy processing in the apparatus according to this embodiment.

Processing will be described in accordance with the flowchart of FIG. 7. If the copy start key 503 is pressed on the control panel of the apparatus, control in accordance with this processing is executed by the controller 100.

A request to start a job is issued to the job management unit 1 at step S720 and a response is awaited at step S721. This is followed by step S701, at which a print-control task for executing print processing is started. Further, a display such as "NOW COPYING" is presented on the status display unit 501 of the control panel. Next, at step S702, documents that have been placed on the document stacker of the automatic document feeder 101 are fed successively to the glass platen 102 at step S702, then the apparatus waits for a document to reach the glass platen 102. When a document is sent to the glass platen 102, a signal indicative of completion of document feed is received from the document feeder 101. At this time, document size information and information indicative of the number of copies is confirmed from information such as document length during document transport. The document size information, document number information, page information, etc., is stored in a predetermined memory at step S704. Next, at step S705, a request to read in an image is sent to a page management control unit 17, and the apparatus waits to obtain permission to use the memory. The page management control unit 17 performs control to process, on a first-come, first-served basis, copy, FAX and PDL requests (step S708).

In regard to the content of processing executed by the page management control unit 17 at step S708, processing is executed in such a manner that image data (read document image data in this case) accepted from the job of interest (copy processing in this case) is stored in the image memory 20 on a per-page basis and upon clarifying that the image data belongs to one job. Simply stated, when a certain job is generated, a folder (directory) corresponding to this job is created and images are stored in the folder on a per-page basis. (File names when images are stored may be dealt with as by assigning sequential numbers.)

When the processing of step S708 is completed, control returns to step S705 and document read-in starts on the basis of the document information that was set at step S704 and the image processing mode that was designated at the control panel. The lamp 103 of the scanner lights and the scanner unit 104 is moved to irradiate the document. Light reflected from the document impinges upon the CCD 109, and the resulting image signal is subjected to image processing based upon settings made at the control panel. Next, the image data is sent, via a selection circuit (not shown), to the image memory 20 managed by the page management control unit 17. The image data is compressed and stored successively by image compression/decompression processing, not shown. It is determined at step S706 whether there is a document to be read in next. If there is no next document, the read-in operation is exited. If there is a next document, processing from step S702 onward is repeated. Read-in is performed in order from page 1, as shown in FIG. 4.

In processing for controlling printing, it is determined at step S710 whether an image has been stored in the image memory 20 by the processing of step S705. If the answer is "NO", then the apparatus waits for an image to be stored. If the answer is "YES", then the processing of step S711 is executed. Here a print request is issued to the page management control unit 17 and control to start printing is executed as soon as permission is granted. Processing to initiate printing starts in the manner illustrated. Next, at step S712, it is judged whether there is a suspension request from the job management unit 1 and whether this is the end of documents that have been read in. If a suspension request has been issued and there is no read-in document, then processing is exited. If there is a read-in document, however, control returns to step S710 and processing is repeated.

Control from step S713 onward will now be described. When printing starts, printing paper is fed from a cassette (S713). The image of a document is read out of the image memory 20 and the apparatus waits for expansion of the image to end (S714). At step S715 the image is output at the proper timing and formed on the printing paper, and the printing paper on which the image has thus been formed is ejected to the exterior of the apparatus through the paper ejection rollers 208. This series of processing steps is executed repeatedly. After the entire printing operation is completed, a message "COPYING POSSIBLE" is displayed on the status display unit 501 of the control panel.

<Processing in PDL print mode>

Figure 8:
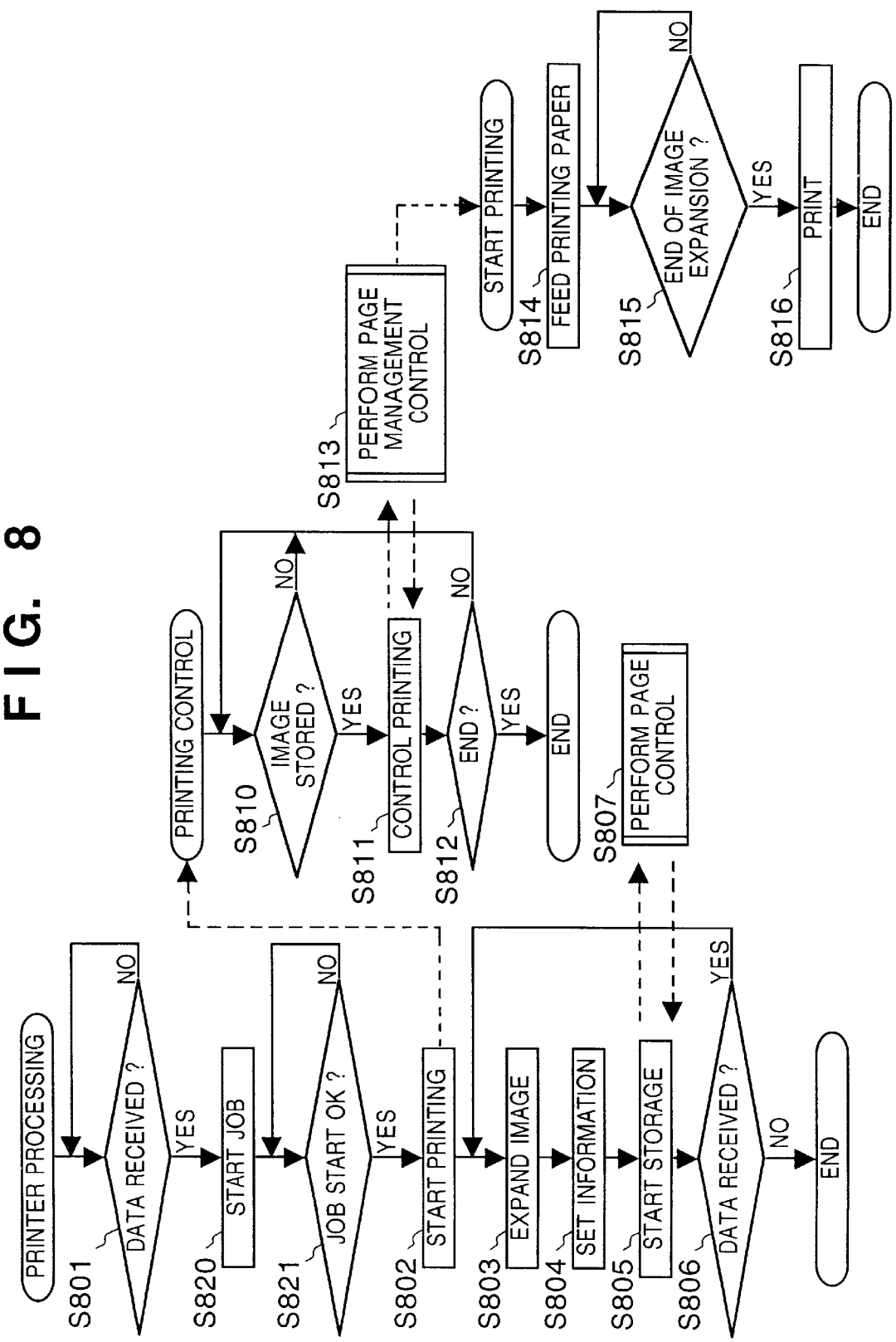
FIG. 8 is a flowchart illustrating the content of PDL print processing in the apparatus according to this embodiment.

The content of processing in a case where the apparatus of this embodiment functions as a printer will be described in accordance with the flowchart of FIG. 8.

First, the PDL interface controller 14 performs monitoring for receipt of print data from a computer (step S801). If print data is received, a request to start a job is issued to the job management unit 1 at step S820 and a response is awaited at step S821. This is followed by step S802, at which a print-control task for executing print processing is started. Next, at step S803, a conversion is made to bitmap data by the PDL image expansion unit 16 in order to obtain a visible image of the information from the computer. This is followed by step S804, at which information for storing the image created at step S803 in the image memory 20 is set. Permission to use the memory for storing data is obtained from the page management control unit 17, and storage in the image memory 20 in the memory controller of page management control unit 17 is started. The format in which files are stored at this time is similar to that of copy processing described earlier. If data of a next page still exists upon conclusion of storage, the processing from step S803 onward is repeated and storage of print data from the computer is performed. The above-described processing is executed until there is no longer any data, i.e., until reception processing for one print job is completed.

In processing for controlling printing, it is determined at step S810 whether an image has been stored in the image memory 20 by the processing of step S805. If the answer is "NO", then the apparatus waits for an image to be stored. If the answer is "YES", then the processing of step S811 is executed. Here a print request is issued to the page management control unit 17 and control to start printing is executed as soon as permission is granted. Processing to initiate printing starts in the manner illustrated. Next, at step S812, it is judged whether this is the end of documents that have been read in. If there is still a document, control returns to step S810 and processing is repeated.

Control from step S813 onward will now be described. When printing starts, printing paper is fed from a cassette (S814). The image of a document is read out of the image memory 20 and the apparatus waits for expansion of the image to end (S815). At step S816 the image is output at the proper timing and formed on the printing paper, and the printing paper on which the image has thus been formed is ejected to the exterior of the apparatus through the paper ejection rollers 208. This series of processing steps is executed repeatedly.

<Processing in facsimile reception mode>

Figure 9:
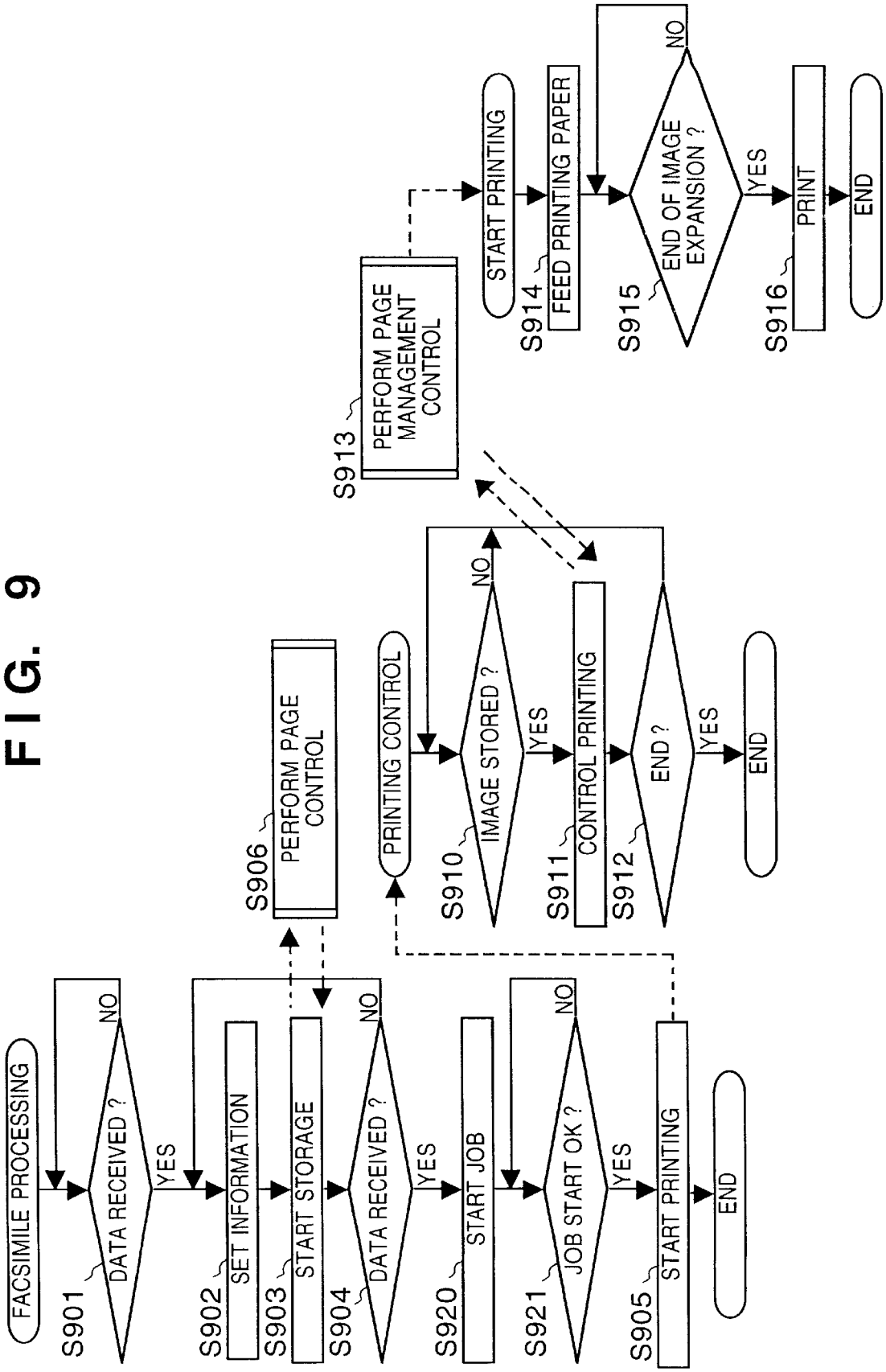
FIG. 9 is a flowchart illustrating the content of facsimile reception processing in the apparatus according to this embodiment.

Facsimile reception processing will now be described in accordance with the flowchart of FIG. 9.

First, the FAX communication controller 10 performs monitoring for receipt of facsimile data from a computer (step S901). Information concerning an image received by facsimile is set at step S902, and permission to use memory for storing data is obtained from the page management control unit 17 at step S903. Storage on a per-page basis in the image memory 20 in the memory controller of page management control unit 17 is started. This is followed by step S904, at which it is determined whether there is data of a next page. If data still exists, processing from step S902 onward is repeated and data from the FAX communication controller 10 is stored. This processing is executed until there is no longer any received data.

After image data of all received pages has been stored, a request to start a job is issued to the job management unit 1 at step S920 and a response is awaited at step S921. This is followed by step S905, at which a print-control task for executing print processing is started.

In processing for controlling printing, it is determined at step S910 whether a received image has been stored in the image memory 20 by the processing of step S903. If the answer is "NO", then the apparatus waits for an image to be stored. If the answer is "YES", then control proceeds to step S911. Here a print request is issued to the page management control unit 17 and control to start printing is executed as soon as permission is granted. Processing to initiate printing starts in the manner illustrated. Next, at step S912, it is judged whether this is the end of data that has been read in. If there is still data, control returns to step S910 and processing is repeated.

Control from step S913 onward will now be described. When printing starts, printing paper is fed from a cassette (S914). The image of a document is read out of the image memory 20 and the apparatus waits for expansion of the image to end (S915). At step S916 the image is output at the proper timing and formed on the printing paper, and the printing paper on which the image has thus been formed is ejected to the exterior of the apparatus through the paper ejection rollers 208. This series of processing steps is executed repeatedly.

Whether or not printing is allowed immediately in response to a print request sent to the page control management unit 17 depends upon the request, the priority of the job being executed at the time and the status of the paper-ejection processing system, as described earlier.

Though not touched upon in the description of the embodiment rendered above, the apparatus of this embodiment may be used in facsimile transmission. When a document image is read and transmitted in such case, these operations are performed at the exclusion of ordinary copying. The reason for this is that both facsimile transmission and copying use the same reader. However, in a case where a facsimile transmission job is executed after a copying job, printout processing in the copying job and reading of a document image for facsimile transmission may of course be performed concurrently if storage of an image in the image memory 20 in the preceding copying job has been completed. Further, in a case where a document specified from a host computer is to be transmitted by facsimile, processing from generation of the document image data to storage in the image memory 20 is the same as that of ordinary printing. For processing from this point onward, however, control shifts to the FAX controller 3 so that transmission may be carried out. Since facsimile transmission is independent of print-out, it may be executed in parallel with print-out associated with another job. This can be achieved by operating the copy controller 2, FAX controller 3 and PDL controller 4 independently of one another and providing the job management unit 1, which manages the respective jobs, and the page management control unit 17, which manages pages, as shown in FIG. 1.

The arrangement of FIG. 1 is not limited to hardware implementation but can also be realized by parallel execution of software groups for implementing the connections illustrated. In the latter case, this can be achieved by a general-purpose information processing apparatus (e.g., a personal computer or the like) having hardware such as a printer, an image scanner and a modem for facsimile transmission. Accordingly, the embodiment can readily be implemented by incorporating software in the apparatus.

In accordance with this embodiment, as described above, the productivity of a job to be output is improved by performing optimum job scheduling upon judging the priorities of jobs, whether or not a sheet processing unit has been connected and, if one has been connected, the type and functions of the sheet processing unit.

Second Embodiment

A second embodiment of the present invention will be described next. The construction of the apparatus in this embodiment is similar to that of the first embodiment. The second embodiment will be described with reference to FIG. 10.

<Processing executed by job management unit>

Figure 10:
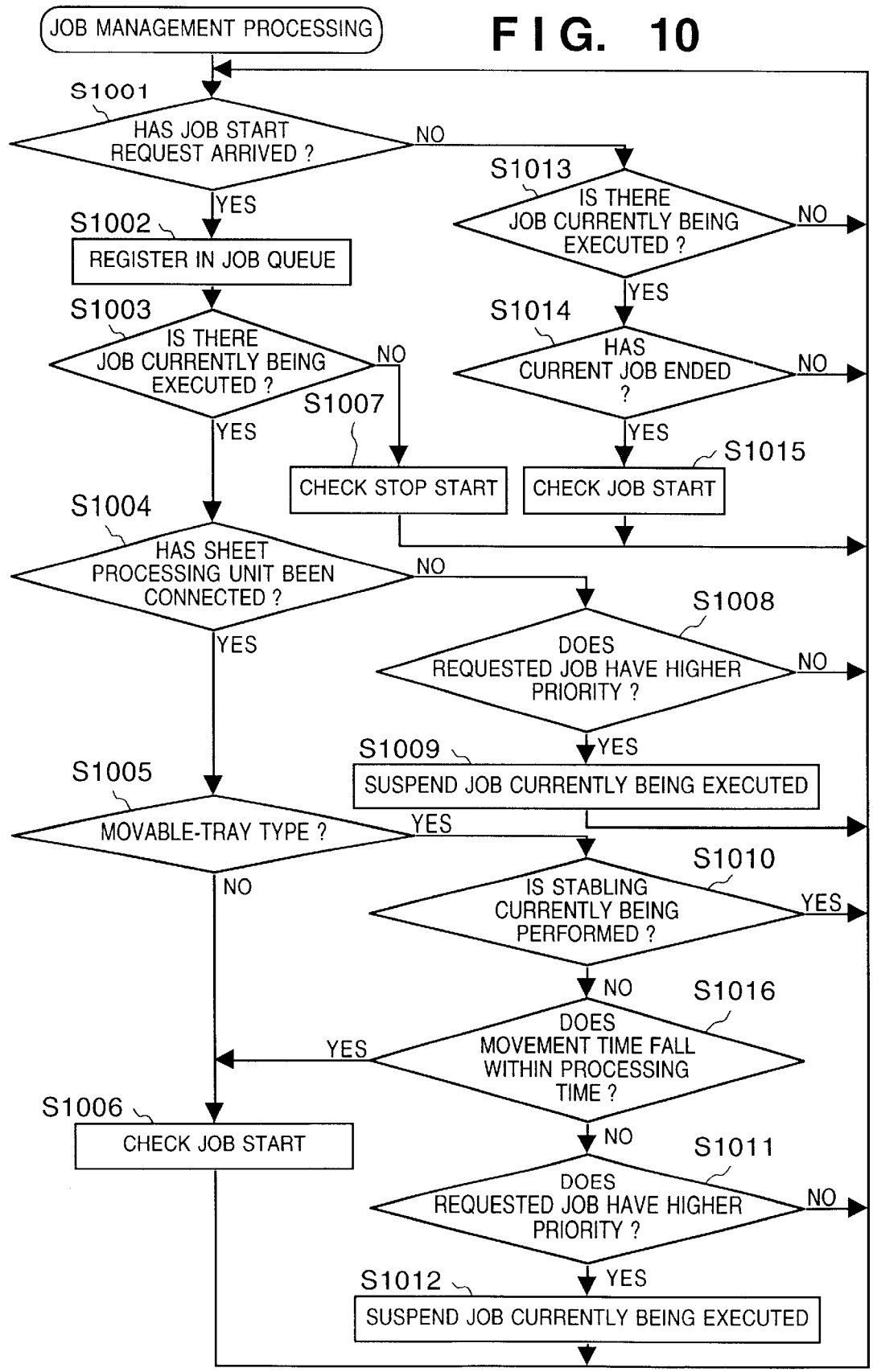
FIG. 10 is a flowchart illustrating job management processing according to a second embodiment of the present invention.

The processing executed by the job management unit 1 will be described in accordance with the flowchart of FIG. 10. This processing is executed by having the CPU within the controller 100 read out and run a program, which has been stored in a ROM (not shown) of the controller 100, that is for execution of this processing.

The apparatus waits for a job (copy, FAX, PDL print, etc.) start request to arrive at step S1001. A start request is received from the copy controller 2 in case of a copy job, from the FAX controller 3 in case of a facsimile job and from the PDL controller 4 in case of a PDL print job. Control proceeds to the processing of step S1002 if a start request is received and to the processing of step S1013 if a start request is not received.

If control proceeds to step S1002, a job for which there has been a start request is registered in a job queue. The job queue will be described on the basis of FIG. 4.

FIG. 4 assumes a case where one job is currently being executed and two jobs are standing by. In a case where a new job arrives, the next job is searched for from the job heads by a job pointer (the seventh item of information), which indicates how the job queue is connected), and a job for which the job pointer is the NULL pointer is found (job 602 in this example). The pointer information indicating the data (the seventh item is made NULL in advance) of new job 603 is set in the job pointer (the seventh item) of job 602 and the job is registered. When a job is finished being executed, the pointer of this job is deleted and the remaining jobs are reconnected.

Next, at step S1003, it is determined whether there is a job currently being executed. If there is no such job, job start processing is executed at step S1007. Registered jobs are searched for starting from the head of the job queue shown in FIG. 4 and a job is started in accordance with the conditions of the job. The job management unit 1 notifies the various controllers of start of the job.

If it is found at step S1003 that a job is currently being executed, then control proceeds to the processing of step S1004. Here it is determined whether the sheet processing unit has been connected to the main body of the image forming apparatus. If the sheet processing unit has not been connected, control proceeds to the processing of step S1008. Here, on the basis of information concerning the printing order of priority designated at the control panel [on the screen of FIG. 5C], the priority of the job for which start has been requested and the priority of the job currently being executed are compared and judged. If the former has a lower priority than the latter (or if the priority has not been set), control returns to step S1001 to wait for execution of the current job to end. If the former has a higher priority than the latter, then the job currently being executed is suspended at step S1009 and control returns to step S1001 so that the job can be executed after suspension.

If it is determined that the sheet processing unit has been connected to the main body of the image forming apparatus, on the other hand, then control proceeds to step S1005 and the type of connected sheet processing unit, i.e., whether the trays are of the movable or stationary type, is determined at step S1005. In case of the stationary type (e.g., sheet processing unit 450), control proceeds to the processing of step S1006. In a case where the sheet processing unit has trays of the stationary type, image formation can be carried out without detracting from the performance of image formation. Even if there is already a job being executed, therefore, the job is performed simultaneously and scheduling processing on a per-page basis becomes possible. At step S1006, therefore, processing similar to that of step S1007 is executed and the job is started. As a result, sheets of the job which were being output previously and sheets of the succeeding job are ejected into the desired trays alternately one sheet at a time. At this time the job management unit 1 reconfigures scheduling in such a manner that a plurality of jobs will be executed in parallel.

In case of the movable-type trays (e.g., sheet processing unit 400), on the other hand, it is required that the trays be changed page by page (i.e., that the trays 411 be moved up and down) in order that the jobs may be executed simultaneously. In this case, the performance of image formation will decline if tray movement time exceeds the minimum time interval of image formation (i.e., if the time required for the printer 300 to execute one page of image formation processing is exceeded). In this embodiment, therefore, unlike the first embodiment, control is performed in such a manner that if a plurality of jobs can be executed simultaneously without causing a decline in the performance of image formation, even if the sheet processing unit having movable trays has been connected to the image forming apparatus, then the plurality of jobs are executed in parallel in order to raise the productivity of the jobs to be output (this will be described later). However, in a case where the job currently being executed is a job in the stapling mode, there is the danger that processing a plurality of jobs concurrently will cause the stapling even of sheets belonging to a job introduced after the job currently being executed. In order to prevent this, it is determined at step S1010 if the stapling mode is currently in effect. If the answer is "YES", then the requested job is suspended and cannot be executed. Accordingly, control returns to step S1001 to wait for conclusion of the job currently being executed. On the other hand, if it is determined at step S1010 that the job currently being executed is not a job in the stapling mode, then control proceeds to step S1016.

It is determined at step S1016 whether time for movement between the paper-ejection tray being used for the job currently being executed and the paper-ejection tray to be used for the job for which the start of printing has been requested falls within the interval of image formation processing by the printer 300, meaning that performance will not be affected. If it is determined that tray movement will be completed by the time one page of image formation processing is completed, then the processing of step S1006 is executed. More specifically, it is determined at step S1016 whether the time required for tray movement (e.g., trays 411) from the position of the paper-ejection tray being used for the job currently being executed to the position of the paper-ejection tray to be used for the job for which the start of printing has been requested exceeds the time needed for the image formation processing of one page.

It should be noted that if movement from a tray currently in use to a tray to be used for the succeeding job is completed by the time the leading edge of a sheet on which formation of an image has been completed arrives in the vicinity of the sheet ejection port (e.g., in the vicinity of the paper ejection rollers 2080 of the main body of the image forming apparatus), then control proceeds from step S1016 to step S1006.

Thus, if tray movement is completed in time, the job currently being executed need not be suspended and this job and the job for which the start of printing has been requested can be processed simultaneously. If it is determined at step S1016 that time required for movement exceeds processing time, the processing of step S1011 is executed. Here, on the basis of information concerning the printing priority designated at the control panel [on the screen of FIG. 5C], the priority of the job for which start has been requested and the priority of the job currently being executed are compared and judged. If the former has a lower priority than the latter (or if the priority has not been set), scheduling is performed so to wait for completion of the job currently being executed, and control returns to step S1001. If the former has a higher priority than the latter, then the job currently being executed is suspended at step S1012 and scheduling is performed so that the requested job can be executed after suspension of the current job. Control returns to step S301 and processing continues.

Figure 11:
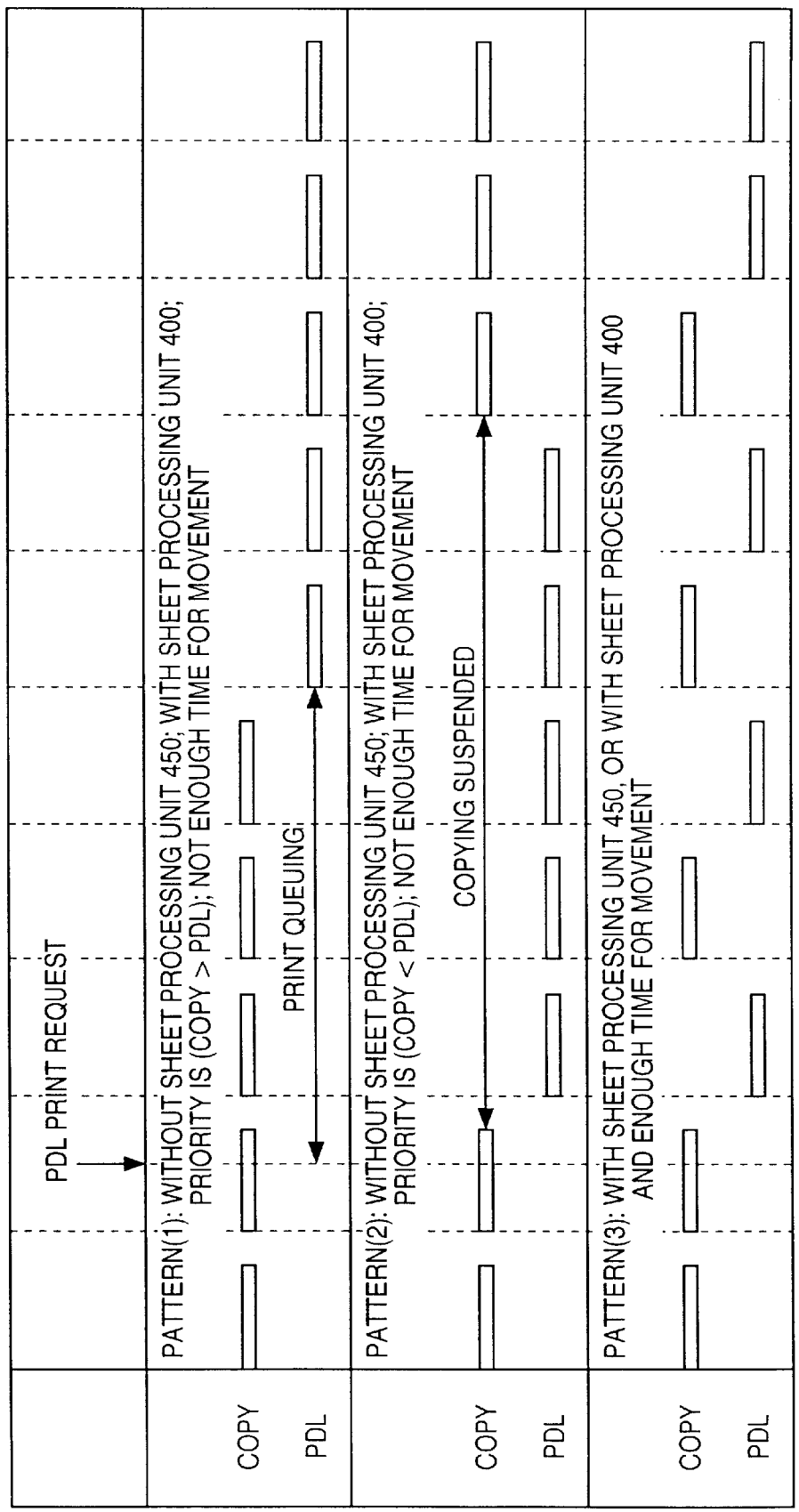
FIG. 11 is a diagram showing the results of scheduling according to the second embodiment.

FIG. 11 illustrates an example in which job scheduling is performed in accordance with the second embodiment. The example of FIG. 11 is for a case where a request to start output of a PDL print job has been entered during execution of a copy job. It is assumed here that the copy and PDL print jobs both involve output of five pages and that the request to start output of the PDL print job has been entered during output of the second page of the copy job.

In FIG. 11, pattern (1) is for describing scheduling performed by the job management unit 1 in a case where the sheet processing unit 450 (stationary-tray type) has not been connected to the apparatus proper, the sheet processing unit 400 (movable-tray type) has been connected to the apparatus proper, the order of priority set on the screen of FIG. 5C is copy>PDL and there is not enough time to effect movement of trays 411 from the position of a tray being used by the job in the copy mode to the position of a tray to be used by the job in the PDL print mode.

In this case, the PDL print job has a priority lower than that of the copy job. As a consequence, the apparatus enters a state in which it waits for the end of the copy job currently being executed. Scheduling is performed in such a manner that output of the PDL print job starts when the copy job ends. It should be noted that the PDL print job placed in the waiting state is image formation processing per se and that expansion into image data and storage in the image memory 20 are performed internally in a manner similar to that of the first embodiment.

Pattern (2) in FIG. 11 is for describing scheduling performed by the job management unit 1 in a case where the sheet processing unit 450 (stationary-tray type) has not been connected to the apparatus proper, the sheet processing unit 400 (movable-tray type) has been connected to the apparatus proper, the order of priority set on the screen of FIG. 5C is copy<PDL and there is not enough time to effect movement of trays 411 from the position of a tray being used by the job in the copy mode to the position of a tray to be used by the job in the PDL print mode.

In this case, the copy job currently being executed is suspended (FIG. 11 indicates suspension of the copy job at the moment the sheet on which the image of the second page of the copy job has been formed is output) and the PDL print job, which has a priority higher than that of the copy job, is started. The copy job is in the suspended state until the PDL print job ends, and output of the copy job is resumed upon waiting for the end of the PDL print job (FIG. 11 indicates that output is resumed from the third page of the copy job). This is how scheduling is performed in the case of pattern (2) in FIG. 11.

Pattern (3) in FIG. 11 is for describing scheduling performed by the job management unit 1 in a case where the sheet processing unit 450 (stationary-tray type) has been connected to the apparatus proper or in a case where the sheet processing unit 400 (movable-tray type) has been connected to the apparatus proper and there is enough time to effect movement of trays 411 from the position of a tray being used by the job in the copy mode to the position of a tray to be used by the job in the PDL print mode.

In this case, scheduling is performed in such a manner that a plurality of entered jobs will be executed in parallel regardless of whether an order of priority has or has not been set on the screen shown in FIG. 5C.

For example, in the case of pattern (3), a PDL print job for which the output-start request was issued after that of the copy job is scheduled on a per-page basis and output together with the copy job. In the illustrated example, the request to start output of the PDL print job is entered while output of the second page of the copy job is in progress. Accordingly, after a sheet on which the image of the second page of the copy job has been formed is ejected into a tray for the copy job, a sheet on which the image of the first page of the PDL print job has been formed is ejected into a tray for the PDL print job. At the next timing, a sheet on which the image of the third page of the copy job has been formed is ejected into the tray for the copy job. At the next timing, a sheet on which the image of the second page of the PDL print job has been formed is ejected into the tray for the PDL print job. At the next timing, a sheet on which the image of the fourth page of the copy job has been formed is ejected into the tray for the copy job. At the next timing, a sheet on which the image of the third page of the PDL print job has been formed is ejected into the tray for the PDL print job. At the next timing, a sheet on which the image of the fifth page of the copy job has been formed is ejected into the tray for the copy job (the copy job is concluded at this point). At the next timing, a sheet on which the image of the fourth page of the PDL print job has been formed is ejected into the tray for the PDL print job, and at the next timing, a sheet on which the image of the fifth page of the PDL print job has been formed is ejected into the tray for the PDL print job. This is how scheduling is performed in the case of pattern (3) in FIG. 11.

Thus, as described above, actions and effects similar to those of the first embodiment can be obtained with the second embodiment as well. Moreover, even if a sheet processing unit of the movable-tray type has been connected to the main body of the image forming apparatus, scheduling is performing in dependence upon the status of use of the sheet processing unit in such a manner that a plurality of jobs will be processed simultaneously, and these jobs are then processed in parallel. As a result, the performance of image formation is not sacrificed and the productivity of jobs to be output can be improved without preparing a sheet processing unit of the fixed-tray type. This makes it possible to raise cost performance.

The second embodiment has been described in regard to a case where there are a plurality of jobs having different data input routes, i.e., a job in the copy mode and a job in the print mode, or a job in the copy mode and a job in the facsimile mode, or a job in the facsimile mode and a job in the print mode. However, this does not impose any limitation; it goes without saying that the processing of this embodiment can be realized even in a case where a plurality of jobs are input in the same mode. For example, even if during execution of a first job in the copy mode a request to start output of a second job in the copy mode is input in the form of interrupt processing, effects similar to those of the above-described embodiment can be obtained by executing processing of the kind shown in FIG. 10.

A modification of the second embodiment will be described next. Described will be a case where a sheet processing unit of movable-tray type has been connected to the main body of the image forming apparatus and has multiple trays. It will be assumed that a sheet processing unit having ten trays capable of being moved up and down has been connected to the image forming apparatus proper.

By way of example, assume that the trays of the sheet processing unit being used by a job (referred to as a "first job" below) currently being executed are first to eighth trays. Assume also that an output request for another job (referred to as a "second job" below) is entered during the output of the first job. In such case the trays usable by the second job will be the trays from the ninth onward. Since there will not be enough time for tray movement, therefore, scheduling which will start output of the second job after the output of the first job is completed is performed and the jobs will be processed one at a time.

On the hand, assume that the trays of the sheet processing unit being used by the first job are only the first and second trays, and assume that an output request for the second job is entered during the output of the first job. In this case the trays usable by the second job will be the trays from the third tray onward. If there is enough time for tray movement in this case, scheduling is performed which will output the first and second jobs alternately on a per-page basis after the input of the request to output the second job, and these multiple jobs are processed in parallel.

Further, the first and second jobs may be processed in parallel in dependence upon the position of a tray currently being accessed even in a case where multiple trays are being used, e.g., the first through eighth trays of the sheet processing unit used by the first job, as in the example set forth above. For instance, assume that an output request for the second job is entered during the output of the first job and that the sheets of the first job at this time are being ejected into the seventh or eighth tray. In this case the tray position is very close to the position of the ninth tray, which is capable of being used by the second job and, hence, there is enough time to effect tray movement. In this case also, therefore, scheduling which will output the first and second jobs alternately on a per-page basis is performed and these multiple jobs are processed in parallel.

In the embodiment described above, a case is described in which the controller 100 performs scheduling in conformity with the status of use of the sheet processing unit and a plurality of entered jobs are processed one at a time or in a parallel fashion. However, this does not impose any limitation, for the controller 100 may control the sheet processing unit in such a manner that the sheets of a plurality of jobs can be ejected in parallel.

By way of example, assume that the finishing unit 400 has been connected to the main body of the image forming apparatus and that, using the control panel [the screen of FIG. 5D], the first, second and third trays of trays 411 have been designated as dedicated trays for jobs in the copy mode, facsimile mode and printer mode, respectively. Assume also that the copy-mode job (referred to as the "first job" below) is currently being output and that a request to start output of the printer-mode job (referred to as the "second job" below) is entered during the output of the first job.

In this case, the tray currently being accessed is, e.g., the tray for the copy-mode job, namely the first tray of trays 411. As a consequence, there is not enough time to move the trays 411 to the tray for the printer-mode job, namely the third tray. Accordingly, in order to process the first and second jobs simultaneously in parallel fashion, it will suffice to exercise control in such a manner that the tray to be used by the second job is decided to be the tray for the facsimile mode, i.e., the second tray of trays 411, and so that the trays 411 are moved up and down in such fashion that the sheets of the first and second jobs can be ejected into these trays alternately on a per-page basis.

More specifically, in order to process a plurality of jobs simultaneously in parallel fashion regardless of whether or not a tray designation has been set in advance at the control panel [on the screen of FIG. 5D], the sheet processing unit is subjected to tray movement control in such a manner that the position of the tray to be used by the second job entered after the first job is decided and the sheets of the first and second jobs are ejected alternately into the respective trays. An example of a method which may be employed to decide the position of the tray to be used by the second job involves using the tray situated closest to the position of the tray being used by the first job currently under execution as the tray to be used by the second job. Alternatively, the tray adopted as the tray to be used by the second job may be a tray which, among the plurality of trays, does not have sheets stacked thereon and which, moreover, is situated closest to the position of the tray being used by the first job currently under execution. Such processing is not limited to the movable-tray-type sheet processing unit and is applicable also to the fixed-type sheet processing unit.

Further, the foregoing embodiments can be realized by a single multifunction device of the kind shown in FIG. 2, as described above, and also by a system of peripherals which implement the respective functions of the multifunction device (a printer with an ejection processing unit, a scanner and a facsimile modem, etc.) and an apparatus (a general-purpose information processing apparatus such as a personal computer) for centralized management of these peripherals.

Accordingly, it goes without saying that the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating-system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Though the embodiments have been described in regard to an example in which a printing mechanism employs an electrophotographic method that relies upon a laser, this does not impose any limitation and any printing technique (e.g., an LED printer, thermal-transfer printer, ink-jet printer, etc.) may be employed as a matter of course.

Further, since the image memory 20 shown in FIG. 1 stores image data page by page generated by an indeterminate number of jobs, it is desired that the image memory 20 be a large-capacity memory. In this sense a storage device such as a hard disk is desirable. Further, the image memory 20 stores image data (images obtained by reading, images obtained by decoding data received by facsimile, and images obtained by interpreting and expanding PDL data). However, an arrangement may be adopted in which decompression processing is applied to all images, regardless of the type of job, when the images are stored.

Thus, in accordance with the embodiments as described above, optimum job scheduling is carried out based upon the priorities of jobs, as a matter of course, and also based upon the state of connection of a sheet processing unit, the type of sheet processing unit, the functions thereof and the status of use. This makes it possible to raise productivity of the jobs to be output.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus having image forming means, to which a sheet processing unit having a sheet storage unit is capable of being connected, for printing an image on a recording medium, storage means for storing image data and a plurality of independent input means for inputting, from different paths, information relating to image data that is to be printed out, said apparatus comprising:

storage control means for managing print requests, which have been input by respective ones of said input means, as respective ones of independent jobs, and storing image data, which is based upon the input information, in said storage means;

priority setting means for setting the priority of a job on a per-input-means basis; and scheduling means for scheduling, by job, an output of image data, which has been stored in said storage means, to said image forming means based upon information which has been set by said priority setting means and status of use of the sheet processing unit of said image forming means, wherein said status of use of said sheet processing unit includes types of the sheet processing unit, and wherein said types of the sheet processing unit include a first type in which said sheet storage unit is capable of being moved up and down, and a second type in which said sheet storage unit is incapable of being moved up and down.

2. The apparatus according to claim 1, wherein said input means includes:

first means for inputting image data from a reader which reads a document image;

second means for inputting a facsimile image via a line; and third means for inputting print data, which is for generating print image data, from a host computer.

3. The apparatus according to claim 1, wherein status of use of said sheet processing unit includes whether or not said sheet processing unit is being used and, if said sheet processing unit is being used, a function which a job currently being executed is using.

4. A method of controlling an image forming apparatus having image forming means, to which a sheet processing unit having a sheet storage unit is capable of being connected, for printing an image on a recording medium, storage means for storing image data and a plurality of independent input means for inputting, from different paths, information relating to image data that is to be printed out, said method comprising:

a storage control step of managing print requests, which have been input by respective ones of said input means, as respective ones of independent jobs, and storing image data, which is based upon the input information, in said storage means;

a priority setting step of setting the priority of a job on a per-input-means basis; and a scheduling step of scheduling, by job, output of image data, which has been stored in said storage means, to said image forming means based upon information which has been set at said priority setting step and status of use of the sheet processing unit of said image forming means, wherein said status of use of said sheet processing unit includes types of the sheet processing unit, and wherein said types of the sheet processing unit include a first type in which said sheet storage unit is capable of being moved up and down, and a second type in which said sheet storage unit is incapable of being moved up and down.

5. The method according to claim 4, wherein said input means includes:

first means for inputting image data from a reader which reads a document image;

second means for inputting a facsimile image via a line; and third means for inputting print data, which is for generating print image data, from a host computer.

6. The method according to claim 4, wherein status of use of said sheet processing unit includes whether or not said sheet processing unit is being used and, if said sheet processing unit is being used, a function which a job currently being executed is using.

7. A storage medium storing computer program code executed by an image forming apparatus having image forming means, to which a sheet processing unit having a sheet storage unit is capable of being connected, for printing an image on a recording medium, storage means for storing image data and a plurality of independent input means for inputting, from different paths, information relating to image data that is to be printed out, said program code functioning as:

storage control means for managing print requests, which have been input by respective ones of said input means, as respective ones of independent jobs, and storing image data, which is based upon the input information, in said storage means;

priority setting means for setting the priority of a job on a per-input-means basis; and scheduling means for scheduling, by job, an output of image data, which has been stored in said storage means, to said image forming means based upon information which has been set by said priority setting means and status of use of the sheet processing unit of said image forming means, wherein said status of use of said sheet processing unit includes types of the sheet processing unit, and wherein said types of the sheet processing unit include a first type in which said sheet storage unit is capable of being moved up and down, and a second type in which said sheet storage unit is incapable of being moved up and down.

8. An image forming apparatus capable of being connected to a sheet stacking apparatus having a plurality of stacking units, said image forming apparatus comprising:

input means capable of inputting data of a plurality of jobs;

image forming means for forming an image, which is based upon data that has been input from said input means, on a sheet;

ejection means for ejecting the sheet, on which the image has been formed, into any of said plurality of stacking units in such a manner that sheets of a plurality of jobs will not become mixed in one stacking unit; and control means for causing sheets of a plurality of input jobs to be ejected, in parallel, in accordance with the type of sheet stacking apparatus connected to said image forming apparatus, wherein types of the sheet stacking apparatus include a first type in which said plurality of stacking units are capable of being moved up and down, and a second type in which said plurality of stacking units are incapable of being moved up and down.

9. The apparatus according to claim 8, further comprising scheduling means for scheduling the plurality of jobs in dependence upon the type of sheet stacking apparatus connected to said image forming apparatus.

10. The apparatus according to claim 8, wherein said control means inhibits ejection of the sheets of the plurality of input jobs, in parallel, in a case where the type of sheet stacking apparatus connected to said image forming apparatus is of the first type, and allows ejection of the sheets of the plurality of input jobs, in parallel, in a case where the type of sheet stacking apparatus connected to said image forming apparatus is of the second type.

11. The apparatus according to claim 8, wherein the plurality of jobs are a job in a copy mode and a job in a facsimile mode.

12. The apparatus according to claim 8, wherein the plurality of jobs are a job in a copy mode and a job in a print mode.

13. The apparatus according to claim 8, wherein the plurality of jobs are a job in a facsimile mode and a job in a print mode.

14. The apparatus according to claim 8, further comprising scheduling means for performing scheduling of the plurality of jobs based upon priority set in advance, and performing rescheduling of the plurality of jobs in conformity with the type of sheet stacking apparatus connected to said image forming apparatus.

15. Am image forming apparatus capable of being connected to a sheet stacking apparatus having a plurality of stacking units, said image forming apparatus comprising:
    input means capable of inputting data of a plurality of jobs;
    image forming means for forming an image, which is based upon data that has been input from said input means, on a sheet;
    ejection means for ejecting the sheet, on which the image has been formed, into any of said plurality of stacking units in such a manner that sheets of a plurality of jobs will not become mixed in one stacking unit; and
    control means for causing sheets of a plurality of input jobs to be ejected, in parallel, in accordance with the status of use of said sheet stacking apparatus connected to said image forming apparatus,
    wherein said plurality of stacking units are capable of being moved up and down;
    said ejection means moves said plurality of stacking units; and
    in a case where a job different from a job undergoing sheet ejection processing by said ejection means has been input anew, said control means causes sheets of the plurality of jobs to be ejected, in parallel, based upon time required to move said plurality of stacking units from the position of the stacking unit currently being used by a previous job to the position of the stacking unit to be used by a succeeding job.

16. The apparatus according to claim 15, wherein said control means inhibits ejection of the sheets of the plurality of jobs in parallel in a case where the time required to move said plurality of stacking units exceeds time required for one page of image formation processing by said image forming means, and allows ejection of the sheets of the plurality of jobs, in parallel in a case where the time required to move said plurality of stacking units is less than the time required for one page of image formation processing.

17. The apparatus according to claim 15, wherein the plurality of jobs are a job in a copy mode and a job in a facsimile mode.

18. The apparatus according to claim 15, wherein the plurality of jobs are a job in a copy mode and a job in a print mode.

19. The apparatus according to claim 15, wherein the plurality of jobs are a job in a facsimile mode and a job in a print mode.

20. The apparatus according to claim 15, further comprising scheduling means for performing scheduling of the plurality of jobs based upon priority set in advance, and performing rescheduling of the plurality of jobs in conformity with status of use of said sheet stacking apparatus connected to said image forming apparatus.

21. A control apparatus for controlling an image forming system having an image forming apparatus capable of being connected to a sheet stacking apparatus having a plurality of stacking units, said image forming apparatus forming an image, which is based upon data of an input job, on a sheet, and said control apparatus comprising:
    control means for causing the sheet to be ejected, on which the image has been formed by said image forming apparatus, into any of said plurality of stacking units in such a manner that sheets of a plurality of jobs will not become mixed in one stacking unit, and
    wherein said control means for causing sheets of a plurality of input jobs to be ejected, in parallel, in accordance with the type of sheet stacking apparatus connected to said image forming apparatus, and
    wherein types of the sheet stacking apparatus include a first type in which said plurality of stacking units are capable of being moved up and down, and a second type in which said plurality of stacking units are incapable of being moved up and down.

22. The apparatus according to claim 21, wherein said control means inhibits ejection of the sheets of the plurality of jobs, in parallel, in a case where the type of sheet stacking apparatus connected to said image forming apparatus is of the first type, and allows ejection of the sheets of the plurality of jobs, in parallel, in a case where the type of sheet stacking apparatus connected to said image forming apparatus is of the second type.

23. The apparatus according to claim 21, wherein the plurality of jobs are a job in a copy mode and a job in a facsimile mode.

24. The apparatus according to claim 21, wherein the plurality of jobs are a job in a copy mode and a job in a print mode.

25. The apparatus according to claim 21, wherein the plurality of jobs are a job in a facsimile mode and a job in a print mode.

26. The apparatus according to claim 21, further comprising scheduling means for performing scheduling of the plurality of jobs based upon priority set in advance, and performing rescheduling of the plurality of jobs in conformity with the type of sheet stacking apparatus connected to said image forming apparatus.

27. A control apparatus for controlling an image forming system having an image forming apparatus capable of being connected to a sheet stacking apparatus having a plurality of stacking units, said image forming apparatus forming an image, which is based upon data of an input job, on a sheet, and said control apparatus comprising:
    control means for causing the sheet to be ejected, on which the image has been formed by said image forming apparatus, into any of said plurality of stacking units in such a manner that sheets of a plurality of jobs will not become mixed in one stacking unit, and
    wherein said control means for causing sheets of a plurality of input jobs to be ejected, in parallel, in accordance with status of use of said sheet stacking apparatus connected to said image forming apparatus, and
    wherein said plurality of stacking units are capable of being moved up and down;
    said control means causes said plurality of stacking units to move and
    in a case where a job different from a job undergoing sheet ejection processing by said ejection means has been input anew, said control means causes sheets of the plurality of jobs to be ejected in parallel based upon time required to move said plurality of stacking units from the position of the stacking unit currently being used by a previous job to the position of the stacking unit to be used by a succeeding job.

28. The apparatus according to claim 27, wherein said control means inhibits ejection of the sheets of the plurality of jobs, in parallel, in a case where the time required to move said plurality of stacking units exceeds time required for one page of image formation processing by said image forming means, and allows ejection of the sheets of the plurality of jobs, in parallel, in a case where the time required to move said plurality of stacking units is less than the time required for one page of image formation processing.

29. The apparatus according to claim 27, wherein the plurality of jobs are a job in a copy mode and a job in a facsimile mode.

30. The apparatus according to claim 27, wherein the plurality of jobs are a job in a copy mode and a job in a print mode.

31. The apparatus according to claim 27, wherein the plurality of jobs are a job in a facsimile mode and a job in a print mode.

32. The apparatus according to claim 27, further comprising scheduling means for performing scheduling of the plurality of jobs based upon priority set in advance, and performing rescheduling of the plurality of jobs in conformity with status of use of said sheet stacking apparatus connected to said image forming apparatus.

33. A control method of controlling an image forming system having an image forming apparatus capable of being connected to a sheet stacking apparatus having a plurality of stacking units, said image forming apparatus forming an image, which is based upon data of an input job, on a sheet, and said control method comprising:

a control step for causing the sheet to be ejected, on which the image has been formed by said image forming apparatus, into any of said plurality of stacking units in such a manner that sheets of a plurality of jobs will not become mixed in one stacking unit, and wherein said control step for causing sheets of a plurality of input jobs to be ejected, in parallel, in accordance with the type of sheet stacking apparatus connected to said image forming apparatus, and wherein types of the sheet stacking apparatus include a first type in which said plurality of stacking units are capable of being moved up and down, and a second type in which said plurality of stacking units are incapable of being moved up and down.

34. A control method of controlling an image forming system having an image forming apparatus capable of being connected to a sheet stacking apparatus having a plurality of stacking units, said image forming apparatus forming an image, which is based upon data of an input job, on a sheet, and said control method comprising:

a control step for causing the sheet to be ejected, on which the image has been formed by said image forming apparatus, into any of said plurality of stacking units in such a manner that sheets of a plurality of jobs will not become mixed in one stacking unit, and wherein said control step for causing sheets of a plurality of input jobs to be ejected, in parallel, in accordance with status of use of said sheet stacking apparatus connected to said image forming apparatus, and wherein said plurality of stacking units are capable of being moved up and down;

said control step causes said plurality of stacking units to move, and in a case where a job different from a job undergoing sheet ejection processing by an ejection means has been input anew, said control step causes sheets of the plurality of jobs to be ejected in parallel based upon time required to move said plurality of stacking units from the position of the stacking unit currently being used by a previous job to the position of the stacking unit to be used by a succeeding job.

35. A control apparatus for controlling a sheet stacking apparatus which is capable of being connected to an image forming apparatus and which has a plurality of stacking units, said image forming apparatus forming an image, which is based upon data of an input job, on a sheet, and said control apparatus comprising:

control means for causing the sheet to be ejected, on which the image has been formed by said image forming apparatus, into any of said plurality of stacking units in such a manner that sheets of a plurality of jobs will not become mixed in one stacking unit; and wherein said control means for controlling an operation of said sheet stacking apparatus in such a manner that sheets of a plurality of jobs input to said image forming apparatus to be ejected, in parallel, without mixing the plurality of jobs in one stacking unit.

36. The apparatus according to claim 35, wherein said control means includes decision means for deciding a stacking unit to be used by a succeeding job in dependence upon position of a stacking unit currently being used by a previous job in a case where a job different from a job undergoing sheet ejection processing by said ejection means has been input anew.

37. The apparatus according to claim 36, wherein said plurality of stacking units are capable of being moved up and down, and said control means controls movement of said plurality of stacking units in such a manner that an operation for ejection of a sheet of the succeeding job into the stacking unit that has been decided by said decision means and an operation for ejection of a sheet of the previous job into a stacking unit to be used by the previous job are repeated in alternating fashion.

38. The apparatus according to claim 36, wherein said decision means decides upon a stacking unit which, among said plurality of stacking units, does not have sheets stacked thereon and which, moreover, is situated closest to the position of the stacking unit currently being used by the preceding job, as the stacking unit to be used by the succeeding job.

39. A control method for controlling a sheet stacking apparatus which is capable of being connected to an image forming apparatus and which has a plurality of stacking units, said image forming apparatus forming an image, which is based upon data of an input job, on a sheet, and said control method comprising:

a control step for causing the sheet to eject, on which the image has been formed by said image forming apparatus, into any of said plurality of stacking units in such a manner that sheets of a plurality of jobs will not become mixed in one stacking unit; and wherein said control step controls an operation of said sheet stacking apparatus in such a manner that sheets of a plurality of jobs input to said image forming apparatus to be ejected, in parallel, without mixing the plurality of jobs in one stacking unit.

40. In a control apparatus for controlling an image forming system having an image forming apparatus capable of being connected to a sheet stacking apparatus having a plurality of stacking units, said image forming apparatus forming an image, which is based upon data of an input job, on a sheet, a computer usable medium having computer readable program code units embodied therein comprising:

a first program code unit for causing the sheet to be ejected, on which the image has been formed by said image forming apparatus, into any of said plurality of stacking unit in such a manner that the sheets of a plurality of jobs will not become mixed in one stacking unit, and a second program control unit for causing sheets of a plurality of input jobs to be ejected, in parallel, in accordance with the type of sheet stacking apparatus connected to said image forming apparatus, wherein types of the sheet stacking apparatus include a first type in which said plurality of stacking units are capable of being moved up and down, a second type in which said plurality of stacking units are incapable of being moved up and down.

41. In a control apparatus for controlling an image forming system having an image forming apparatus capable of being connected to a sheet stacking apparatus having a plurality of stacking units, said image forming apparatus forming an image, which is based upon data of an input job, on a sheet, a computer usable medium having computer readable program code units embodied therein comprising:

a first program code unit for causing the sheet to be ejected, on which the image has been formed by said image forming apparatus, into any of said plurality of stacking unit in such a manner that the sheets of a plurality of jobs will not become mixed in one stacking unit;

a second program unit for causing sheets of a plurality of input jobs, in parallel to be ejected, in accordance with a status of use of said sheet stacking apparatus connected to said image forming apparatus;

a third program unit for causing to move the plurality of stacking units, wherein said plurality of stacking units are capable of being moved up and down; and a fourth program unit operating in a case where a job different from a job undergoing sheet ejection processing by said ejection means has been input anew, for causing sheets of the plurality of jobs to be ejected in parallel based upon time required to move said plurality of stacking units from the position of the stacking unit currently being used by a previous job to the position of the stacking unit being used by a succeeding job.

42. In a control apparatus for controlling a sheet stacking apparatus which is capable of being connected to an image forming apparatus and which has a plurality of stacking units, said image forming apparatus forming an image, which is based upon data of an input job, on a sheet, a computer usable medium having computer readable program code units embodied therein comprising:

a first program code unit for causing the sheet to be ejected, on which the image has been formed by said image forming apparatus, into any of said plurality of stacking units in such a manner that sheets of a plurality of jobs will not become mixed in one stacking unit; and a second program unit for controlling an,operation of said sheet stacking apparatus in such a manner that sheets of a plurality of jobs input to said image forming apparatus to be ejected, in parallel, without mixing the plurality of jobs in one stacking unit.

43. A control apparatus for controlling an image forming apparatus capable of being connected to a sheet processing apparatus having a sheet storage unit, wherein said image forming apparatus has an input means for inputting data of job and image forming means for forming an image, which is based upon data of an input job on a sheet, said control apparatus comprising:

control means for controlling image forming processing of a plurality of jobs input by said input means, wherein said control means allows image forming processing of the plurality of jobs in parallel in a case where said sheet processing apparatus is connected to said image forming apparatus, and inhibits image forming processing of the plurality of jobs in parallel in a case where said sheet processing apparatus is not connected to said image forming apparatus.

44. The apparatus according to claim 43, wherein said control means, while executing image forming processing of one of the plurality of jobs, allows image forming processing of another job of the plurality of jobs in a case where said sheet processing apparatus is connected to said image forming apparatus, and inhibits, while executing image forming processing of one of the plurality of jobs, image forming processing of another job of the plurality of jobs in a case where said sheet processing apparatus is not connected to said image forming apparatus.

45. The apparatus according to claim 44, when second job is input while executing image forming processing of first job, said control means allows, in a case where said sheet processing apparatus is connected to said image forming apparatus, image forming processing of the second job while executing the first job, and said control means, in a case where said sheet processing apparatus is not connected to said image forming apparatus, inhibits image forming processing of the first and second job in parallel and control, while executing image forming processing of either first job or second job, so that image forming processing of the other job is not executed.

46. The apparatus according to claim 45 wherein said control means determines whether to execute either first job or second job based on printing priority in a case where said sheet processing apparatus is not connected to said image forming apparatus.

47. The apparatus according to claim 43, wherein the type of said sheet processing apparatus connectable to said image forming apparatus includes a first type in which said sheet storage unit is capable of being moved up and down, and a second type in which said sheet storage unit is incapable of being moved up and down.

48. The apparatus according to claim 47, wherein said control means inhibits image forming processing of the plurality of jobs in parallel in a case where said sheet processing apparatus connected to said image forming apparatus is the first type, and allows image forming processing of the plurality of jobs in parallel in a case where said sheet processing apparatus connected to said image forming apparatus is the second type.

49. The apparatus according to claim 43, wherein said control means includes scheduling means for performing scheduling of a plurality of jobs.

50. The apparatus according to claim 43, wherein said control means executes, in unit of page, image forming processing of the plurality of jobs in parallel in a case where said sheet processing apparatus is connected to said image forming apparatus.

51. The apparatus according to claim 43, wherein the plurality of jobs input by said input means are a job in a copy mode and a job not in a copy mode.

52. The apparatus according to claim 51, wherein the plurality of jobs include mode jobs differing from each other.

53. The apparatus according to claim 51, wherein the plurality of jobs include mode jobs identical to each other.

54. The apparatus according to claim 51, wherein said job not in copy mode includes a job in facsimile mode or a job in a print mode.

55. A control method for controlling an image forming apparatus capable of being connected to a sheet processing apparatus having a sheet storage unit, wherein said image forming apparatus has an input means for inputting data of job and image forming means for forming an image, which is based on data of an input job, on a sheet, said method comprising:

a control step of controlling image forming processing of a plurality of jobs input by said input means, wherein said control step allows image forming processing of the plurality of jobs in parallel in a case where said sheet processing apparatus is connected to said image forming apparatus, and inhibits image forming processing of the plurality of jobs in parallel in a case where said sheet processing apparatus is not connected to said image forming apparatus.

56. The method according to claim 55, wherein said image forming apparatus is capable of connecting one of a plurality of types of sheet processing apparatus including a first type in which said sheet storage unit is capable of being moved up and down, and a second type in which said sheet storage unit is incapable of being moved up and down.

57. The method according to claim 56, wherein said control step inhibits image forming processing of the plurality of jobs in parallel in a case where said sheet processing apparatus connected to said image forming apparatus is the first type, and allows image forming processing of the plurality of jobs in parallel in a case where said sheet processing apparatus connected to said image forming apparatus is the second type.

58. A control apparatus for controlling an image forming apparatus capable of being connected to a sheet processing apparatus having a sheet storage unit, wherein said image forming apparatus has an input means for inputting data of a job and image forming means for forming an image, which is based upon data of an input job on a sheet, a computer usable medium having computer readable program code units embodied therein comprising:

a first program code unit for controlling image forming processing of a plurality of jobs input by said input means;

a second program unit for allowing image forming processing of the plurality of jobs in parallel in a case where said sheet processing apparatus is connected to said image forming apparatus;

a third program unit for inhibiting image forming processing of the plurality of jobs in parallel in a case where said sheet processing apparatus is not connected to said image forming apparatus.

* * * * *

UNITED STATES PATENT AND TRADEMARK OFFICE
CERTIFICATE OF CORRECTION

PATENT NO. : 6,347,203 B1
DATED : February 12, 2002
INVENTOR(S) : Satoru Kutsuwada It is certified that error appears in the above-identified patent and that said Letters Patent is hereby corrected as shown below:

Column 2,
Line 66, "document-read-in, should read -- document read-in, --.

Column 3,
Line 8, "an" should read -- a --.

Column 18,
Line 43, "On the hand," should read -- On the other hand, --.

Column 23,
Line 13, "Am" should read -- An --.

Column 24,
Line 61, "move and" should read -- move, and --.

Column 27,
Line 55, "an, operation" should read -- an operation --.

Column 28,
Line 31, "claim 45" should read -- claim 45, --.

Column 30,
Line 20, "apparatus;" should read -- apparatus; and --.

Signed and Sealed this

Twenty-first Day of May, 2002

Attest:

*Attesting Officer*

JAMES E. ROGAN
*Director of the United States Patent and Trademark Office*